United States Patent

Abadir

(10) Patent No.: US 9,553,834 B2
(45) Date of Patent: Jan. 24, 2017

(54) ELECTRONIC MESSAGING SYSTEM INVOLVING ADAPTIVE CONTENT

(71) Applicant: Aspire Ventures, LLC, Lancaster, PA (US)

(72) Inventor: Essam Abadir, Lancaster, PA (US)

(73) Assignee: Wylei, Inc., Lancaster, PA (US)

(*) Notice: Subject to any disclaimer, the term of this patent is extended or adjusted under 35 U.S.C. 154(b) by 160 days.

(21) Appl. No.: 14/448,234

(22) Filed: Jul. 31, 2014

(65) Prior Publication Data

US 2016/0036741 A1 Feb. 4, 2016

(51) Int. Cl.
| | | |
|---|---|---|
| G06F 15/16 | (2006.01) | |
| H04L 12/58 | (2006.01) | |
| G06Q 30/02 | (2012.01) | |
| H04W 4/02 | (2009.01) | |
| H04W 4/12 | (2009.01) | |

(52) U.S. Cl.
CPC ............. *H04L 51/063* (2013.01); *G06Q 30/02* (2013.01); *H04W 4/02* (2013.01); *H04W 4/12* (2013.01)

(58) Field of Classification Search
CPC ......... H04L 51/063; H04L 67/02; H04L 67/10
See application file for complete search history.

(56) References Cited

U.S. PATENT DOCUMENTS

| | | | | |
|---|---|---|---|---|
| 6,725,381 B1* | 4/2004 | Smith | ................... | H04L 12/587 713/168 |
| 7,783,709 B2 | 8/2010 | Liezenberg et al. | | |
| 8,122,018 B2* | 2/2012 | Stanis | .................... | G06Q 30/02 705/14.72 |
| 8,145,718 B1* | 3/2012 | Kacker | ................. | H04L 9/0847 709/206 |
| 8,468,049 B2* | 6/2013 | Quan | ..................... | G06Q 30/02 705/14.4 |
| 8,682,979 B2* | 3/2014 | LeVasseur | .............. | H04L 51/34 709/204 |
| 2004/0083259 A1* | 4/2004 | Tenembaum | ........ | G06Q 10/107 709/201 |
| 2004/0215479 A1* | 10/2004 | Dorsey | ................ | G06Q 10/107 709/206 |
| 2006/0010211 A1* | 1/2006 | Patrick | ................. | G06Q 10/107 709/206 |
| 2007/0022003 A1* | 1/2007 | Chao | ....................... | G06Q 30/02 705/14.46 |
| 2007/0124399 A1* | 5/2007 | Gillespie | .............. | G06Q 10/107 709/206 |
| 2008/0244022 A1* | 10/2008 | Johnson | ............... | G06Q 10/107 709/206 |

(Continued)

FOREIGN PATENT DOCUMENTS

WO 2007/032676 A2 3/2007

*Primary Examiner* — Mohamed Wasel
(74) *Attorney, Agent, or Firm* — Merchant & Gould, P.C.

(57) ABSTRACT

An electronic messaging system is provided to generate and send electronic messages that contain adaptive content to customize the electronic messages for each recipient. The system operates to receive an adaptive content asset and a content rule, select a set of adaptive content elements from the adaptive content asset based upon the content rule, and send a content locator to an author computing device to permit the author computing device to include the content locator in the electronic message and send the electronic message to a recipient computing device.

20 Claims, 20 Drawing Sheets

(56) References Cited

U.S. PATENT DOCUMENTS

| | | | |
|---|---|---|---|
| 2010/0250714 A1* | 9/2010 | Wehmann | G06Q 30/02 709/220 |
| 2013/0117107 A1* | 5/2013 | Evans | G06Q 30/0276 705/14.53 |
| 2015/0006283 A1* | 1/2015 | Baca | G06F 17/2235 705/14.49 |
| 2015/0195227 A1* | 7/2015 | Kassemi | H04L 63/08 709/206 |
| 2016/0027066 A1* | 1/2016 | Sachson | G06Q 30/0275 705/14.71 |
| 2016/0034953 A1* | 2/2016 | Wall | G06Q 30/0255 705/14.53 |

* cited by examiner

142

| CUSTOMIZATION CRITERIA 250 | | | | CONTENT OUTPUT 252 | | |
|---|---|---|---|---|---|---|
| TIME | LOCATION | PROGRAM | ...... | STA. | CUST. | BCG |
| X1 | Y1 | Z1 | ...... | A1 | B1 | C1 |
| X2 | Y1 | Z1 | ...... | A1 | B2 | C1 |
| X3 | Y1 | Z1 | ...... | A1 | B3 | C1 |
| X1 | Y2 | Z1 | ...... | A1 | B7 | C1 |
| ⋮ | ⋮ | ⋮ | ⋮ | ⋮ | ⋮ | ⋮ |

FIG. 8

| LOCATION | LOCAL TIME | PROGRAM | ..... | CONTENT ID |
|---|---|---|---|---|
| X1 | Y1 | Z1 | ..... | image1.jpg |
| X2 | Y2 | Z1 | ..... | image2.jpg |
| ..... | ..... | ..... | ..... | ..... |

FIG. 11

ELECTRONIC MESSAGING SYSTEM INVOLVING ADAPTIVE CONTENT

BACKGROUND

Electronic marketing is performed by sending commercial electronic messages, such as email messages, to a group of current or potential customers. The electronic messages typically include advertisements, business requests, and/or loyalty enhancement materials. To maximize the impact of an electronic marketing campaign, significant time and effort is often put into planning and designing the look and content of email messages based on known or assumed needs or interests of the targeted message recipients. However, it can be difficult to execute a successful electronic marketing strategy using static content that is sufficiently tailored to all of the variety of different characteristics of the targeted message recipients.

SUMMARY

In general terms, this disclosure is directed to an electronic messaging system involving adaptive content. In one possible configuration and by non-limiting example, the system operates to generate and send electronic messages that contain adaptive content to customize the electronic messages for each recipient. Various aspects are described in this disclosure, which include, but are not limited to, the following aspects.

One aspect is a method of providing adaptive content in an electronic message, the method comprising: receiving an adaptive content asset, the adaptive content asset including adaptive content elements configured to be used in the electronic message; receiving a content rule, the content rule including customization criteria, wherein the customization criteria includes a plurality of customization conditions associated with a recipient computing device; selecting a set of the adaptive content elements from the adaptive content asset, the set of the adaptive content elements being selected to satisfy the plurality of customization conditions in the customization criteria; and sending a content locator to an author computing device to permit the author computing device to include the content locator in the electronic message and send the electronic message to the recipient computing device.

In at least some examples, the method further comprises: receiving a request from the recipient computing device, the request including the content locator and at least one customization factor associated with the recipient computing device; determining a first customization condition from the at least one customization factor based upon the adaptive content rule; locating a first adaptive content element among the set of the adaptive content elements, the first adaptive content element satisfying the first customization condition based upon the content rule; generating an updated content locator to the recipient computing device, the updated content locator configured to locate the first adaptive content element; and sending a redirect response with the updated content locator to the recipient computing device.

Another aspect is an adaptive content management system for providing adaptive content in an electronic message; the system comprising: a processing device configured to control an adaptive content management engine; an adaptive content database; and a computer readable storage device storing software instructions that, when executed by the processing device, cause the adaptive content management engine to: receive an adaptive content asset, the adaptive content asset including adaptive content elements configured to be used in the electronic message, wherein the adaptive content asset is stored in the adaptive content database; receive a content rule, the content rule including customization criteria, wherein the customization criteria includes a plurality of customization conditions associated with a recipient computing device; select a set of the adaptive content elements from the adaptive content asset, the set of the adaptive content elements being selected to satisfy the plurality of customization conditions in the customization criteria; and send a content locator to an author computing device to permit the author computing device to include the content locator in the electronic message and sends the electronic message to the recipient computing device.

Yet another aspect is an adaptive content management system for providing adaptive content in an electronic message; the system comprising: a processing device configured to control an adaptive content management engine; an adaptive content database; and a computer readable storage device storing software instructions that, when executed by the processing device, cause the adaptive content management engine to: receive an adaptive content asset, the adaptive content asset including adaptive content elements configured to be used in the electronic message, wherein the adaptive content asset is stored in the adaptive content database; receive a content rule, the content rule including customization criteria, wherein the customization criteria includes a plurality of customization conditions associated with a recipient computing device; select a set of the adaptive content elements from the adaptive content asset, the set of the adaptive content elements being selected to satisfy the plurality of customization conditions in the customization criteria; generate an adaptive content file configured to store the set of the adaptive content elements, wherein the adaptive content file is stored in the adaptive content database; send a content locator to an author computing device to permit the author computing device to include the content locator in the electronic message and sends the electronic message to the recipient computing device; receive a request from the recipient computing device, the request including the content locator and at least one customization factor associated with the recipient computing device; determine a first customization condition from the at least one customization factor based upon the adaptive content rule; locate a first adaptive content element among the set of the adaptive content elements, the first adaptive content element satisfying the first customization condition based upon the content rule; generate a updated content locator to the recipient computing device, the updated content locator configured to locate the first adaptive content element; send a redirect response with the updated content locator to the recipient computing device; receive a second request from the recipient computing device, the second request including the updated content locator; and provide the first adaptive content element to the recipient computing device.

BRIEF DESCRIPTION OF THE DRAWINGS

FIG. 8 illustrates an example content rule.

FIG. 11 illustrates an example rule file.

DETAILED DESCRIPTION

Figure 1:
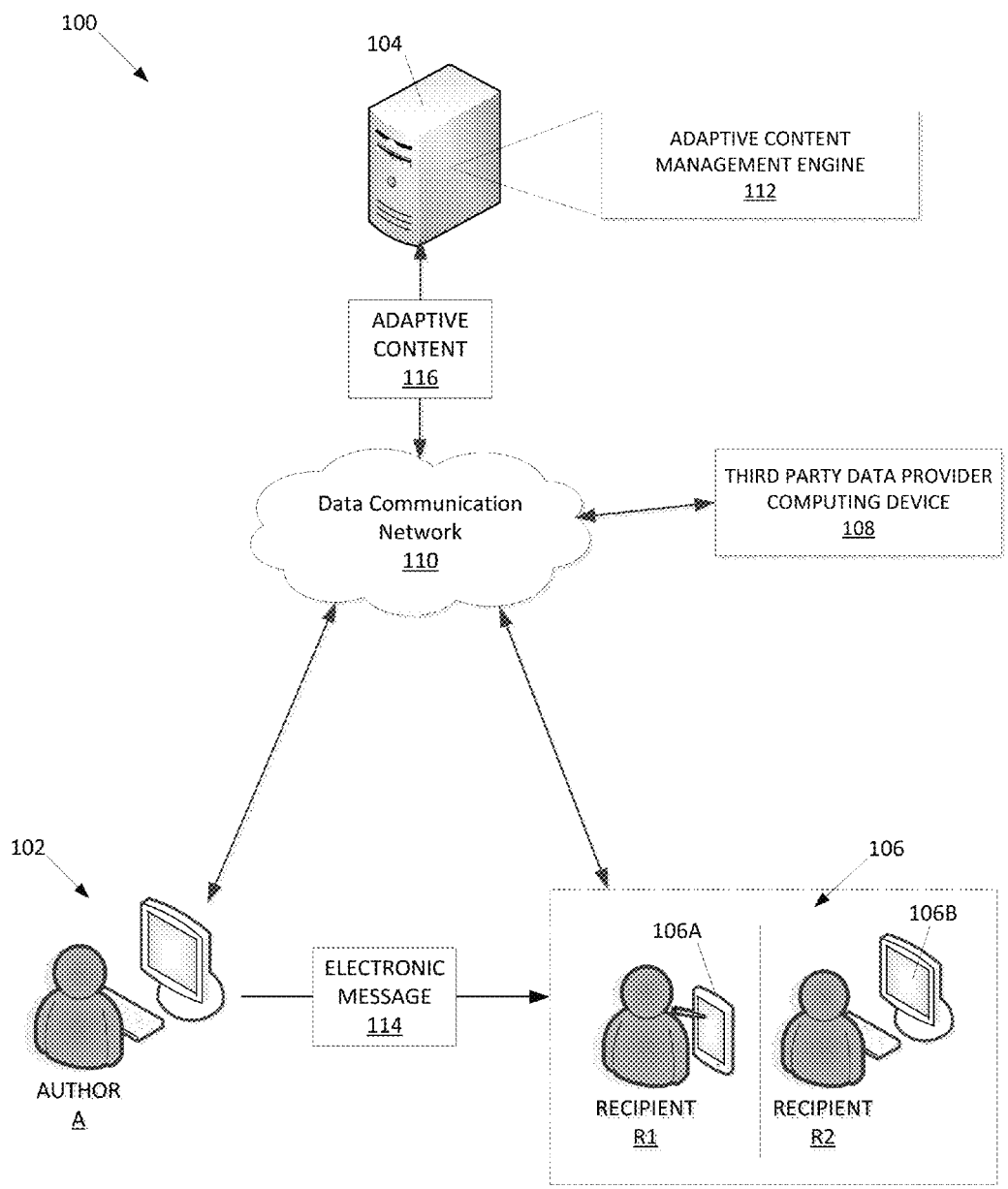
FIG. 1 illustrates an example electronic messaging system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example electronic messaging system 100. The electronic messaging system 100 includes an author computing device 102, a content management computing device 104, one or more recipient computing devices 106, and a third party data provider computing device 108. The electronic messaging system 100 communicates across a data communication network 110. The content management computing device 104 includes an adaptive content management engine 112. Also shown are author A and recipients R (including R1 and R2).

The electronic messaging system 100 operates to generate and send electronic messages that contain adaptive content to customize the electronic messages for each recipient. In at least one embodiment, the author A can be a marketer, or a person or business, that prepares and sends the electronic message 114 for electronic marketing. The electronic marketing activities are business marketing activities that send electronic messages to potential or current customers to send advertisements, request business, or solicit sales or donations. The recipients R (including R1 and R2) can be potential or current customers. The recipients R can be located in the same place or different places. The recipients R can be in the same time zone or different time zones. The recipients R can receive the same electronic message but can open it at different times and/or in difference places to find different adaptive content contained in the electronic message.

In at least one embodiment, the author computing device 102 operates to allow the author A to design an electronic message 114 to be sent to the recipient computing devices 106. In at least one embodiment, the electronic message 114 is designed to include adaptive content which may be subsequently provided by the content management computing device 104. Prior to that, the author A designs the various possible message contents and sends it to the content management computing device 104. An example of the author computing device 102 is described and illustrated with reference to FIGS. 4-8.

In at least one embodiment, the electronic message 114 includes an email, an instant message, a personal message, a text message, and other digital or electronic messages. The electronic message 114 can include one or more locators. For example, email messages (e.g., HTML type) can include in-line links, such as a uniform resource locator (URL). The personal message is a communication on social platforms or private messaging services. For example, social platforms, such as Twitter®, Facebook® and Instagram®, include personal messaging features to provide space for communication among users. The text message is an electronic message among mobile devices over a cellular network. The text message can be sent using the Short Message Service (SMS) or the Multimedia Message Service (MMS).

The content management computing device 104 operates to communicate with the author computing device 102 to receive the various message contents from the author computing device 102. The content management computing device 104 also operates to communicate with the recipient computing devices 106 to receive requests for contents in the electronic message 114 and transmit the requested contents to the recipient computing devices 106. An example of the content management computing device 104 is illustrated and described with reference to FIG. 9.

The content management computing device 104 includes the adaptive content management engine 112 configured to prepare adaptive content 116 from the adaptive content asset 140 and transmit the adaptive content 116 to the recipient computing devices 106. As described below, the adaptive content 116 is a content included in the electronic message 114 and configured to change depending on different conditions and/or situations of the recipient R that uses the recipient computing device 106. For example, the adaptive content 116 of the electronic message 114 is automatically updated or modified for different recipients R at different times and/or in different locations. Thus, the recipients R1 and R2 using different recipient computing devices 106A and 106B can see different contents in the same electronic message 114. Further, the same recipient R can see different contents as the recipient R opens the electronic message 114 at different times and/or in different locations. An example of the adaptive content management engine 112 is described and illustrated with reference to FIGS. 9-15.

The recipient computing devices 106 (e.g., 106A and 106B) operate to receive the electronic message 114 from the author computing device 102 and provide an interface for recipients R (e.g., R1 and R2) to open the electronic message 114. The recipient computing devices 106 are also configured to interact with the content management computing device 104 to request and receive the adaptive content 116 associated with the received electronic message 114.

As described below, the plurality of recipient computing devices 106A and 106B can be located in different places while receiving the same electronic message 114 from the author computing device 102. Further, a plurality of recipients R1 and R2 can receive and open the same electronic message 114 at different times in different locations. According to a time, a location, a user agent, and/or other factors, or a combination thereof, associated with the recipient R, the adaptive content 116 in the electronic message 114 can be updated and/or modified to provide appropriate contents to the recipient R. An example of the recipient computing device 106 is described and illustrated with reference to FIGS. 18 and 19.

At least one embodiment further includes the third party data provider computing device 108 that operates to provide additional information or contents that are included in the electronic message 114. In at least one embodiment, the third party data provider computing device 108 operates to communicate with the content management computing device 104 and receives a request for additional data or contents from the content management computing device 104. Examples of such additional data include weather information, inventory status, and geolocation. As described below, when the content management computing device 104 (e.g., the adaptive content management engine 112) sends a request for additional information with one or more conditions (e.g., weather update at a predetermined time in a predetermined location, or real-time weather update), the third party data provider computing device 108 processes the request and respond with the additional information associated with the conditions.

The data communication network 110 communicates digital data between one or more computing devices, such as among the author computing device 102, the content management computing device 104, the recipient computing devices 106, and the third party data provider computing device 108. Examples of the network 110 include one or more of a local area network and a wide area network, such as the Internet.

In some embodiments, the network 110 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as devices utilizing wireless routers or wireless access points), cellular communication devices (such as devices utilizing one or more cellular base stations), and other wireless communication devices.

Figure 2:
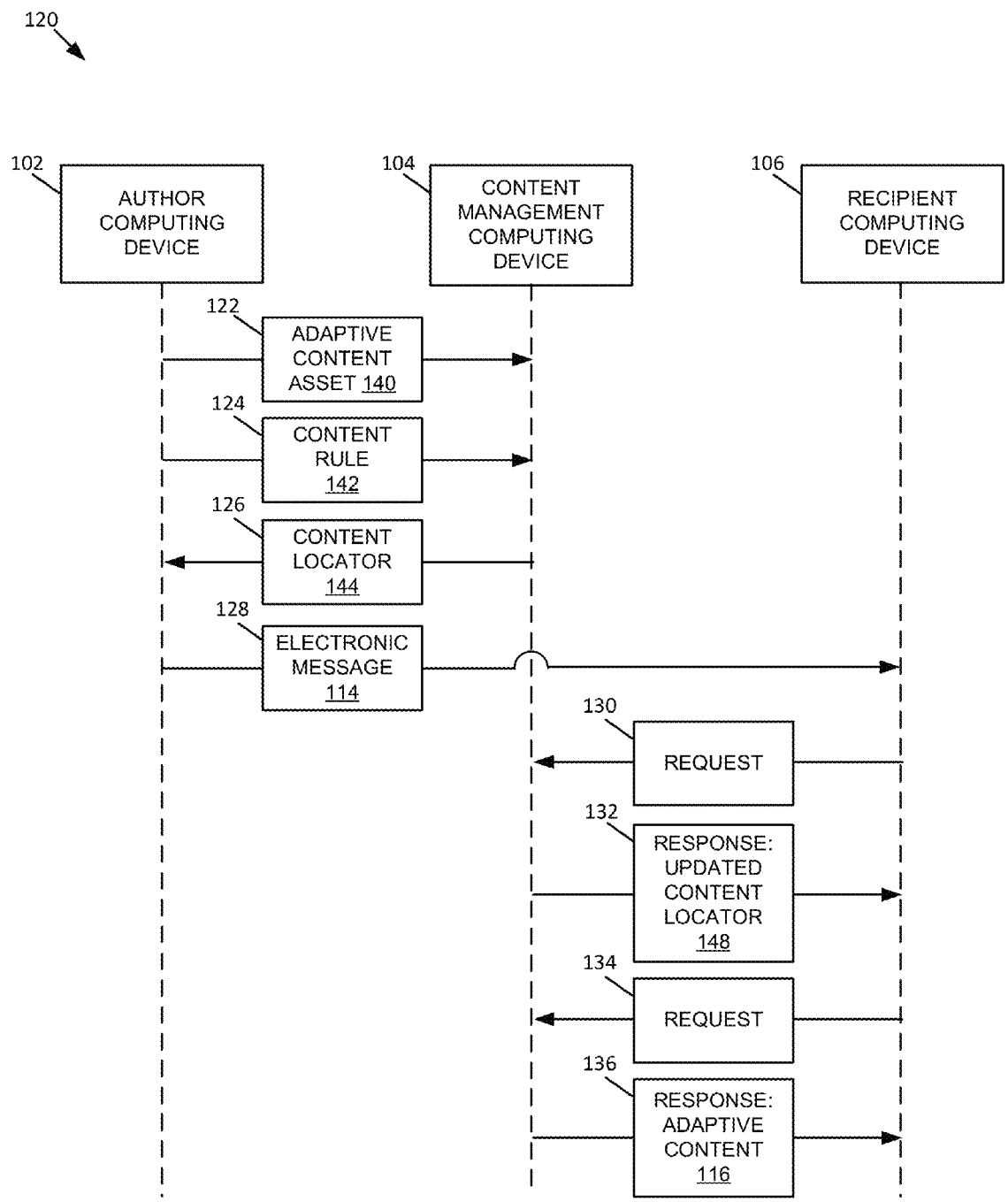
FIG. 2 illustrates an example method of operating the system of FIG. 1 to manage adaptive content of an electronic message.
Figure 3:
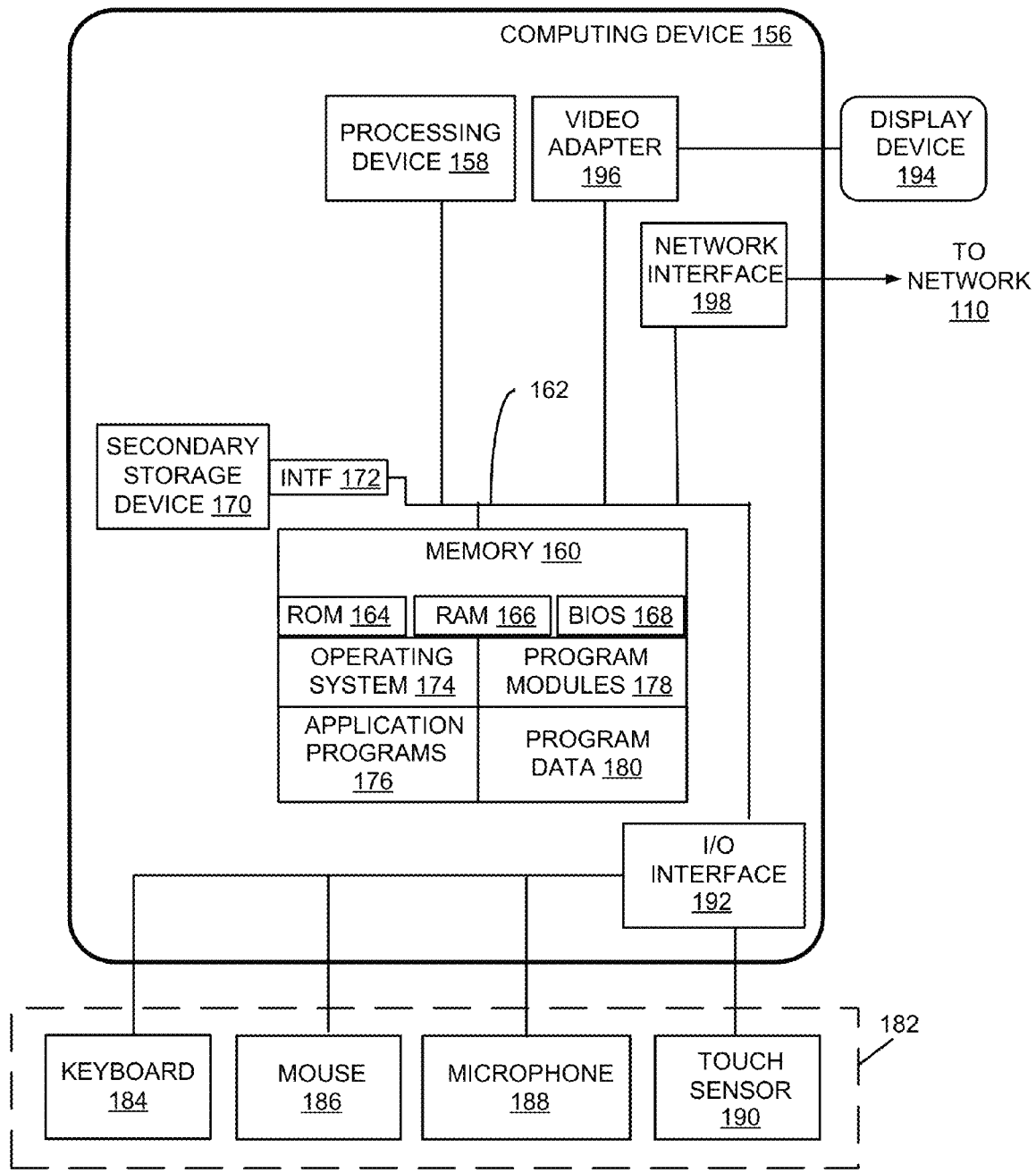
FIG. 3 illustrates an exemplary architecture of a computing device that can be used to implement aspects of the present disclosure.

FIG. 2 illustrates an example method 120 of operating the system 100 to manage adaptive content 116 of the electronic message 114. In this example, the method 120 includes operations 122, 124, 126, 128, 130, 132, 134 and 136. The method 120 includes operations that are performed by one or more processors (such as the processing device 158, as depicted in FIG. 3).

At the operation 122, the author computing device 102 transmits an adaptive content asset 140 to the content management computing device 104. The adaptive content asset 140 is a group of contents, at least part of which can be selectively included in the electronic message 114. In at least one embodiment, the adaptive content asset 140 can be created by the author A using the author computing device 102. An example of the adaptive content asset 140 is illustrated and described with reference to FIG. 7.

Figure 7:
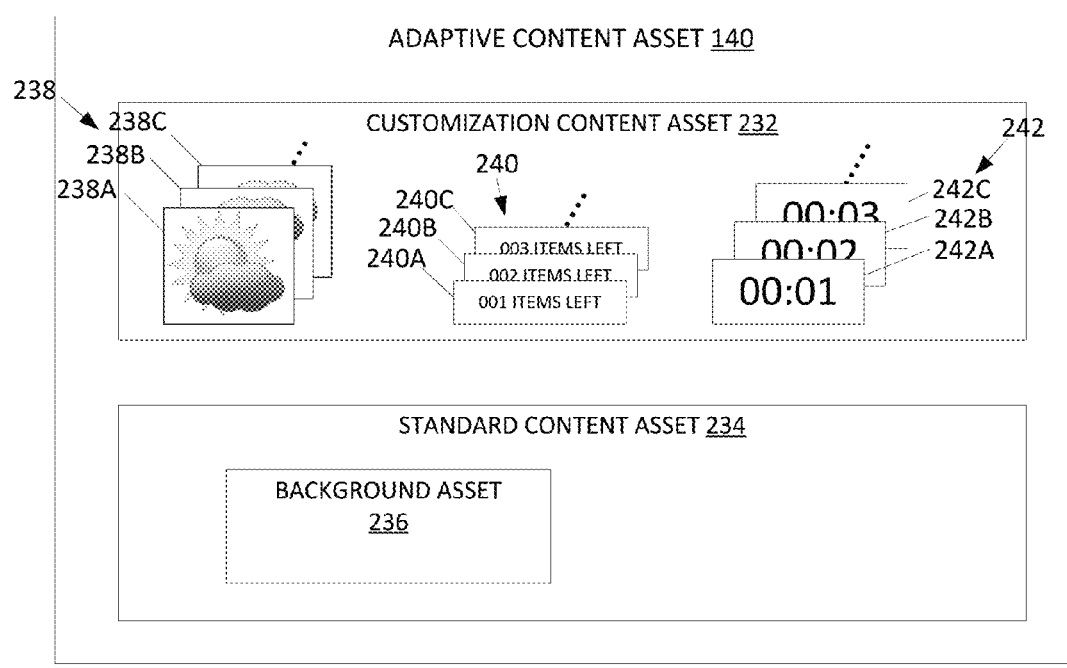
FIG. 7 is a schematic view of an example adaptive content asset.

At the operation 124, the author computing device 102 sends a content rule 142 to the content management computing device 104. The content rule 142 is a set of rules that associate conditions (i.e., criteria or factors) regarding the recipient R with one or more contents (e.g., contents 238, 240, and 242) in the adaptive content asset 140 (FIG. 7). When the content management computing device 104 receives the adaptive content asset 140 and the content rule 142, the content management computing device 104 operates to select adaptive content 116 (e.g., adaptive content elements 336 in FIG. 12) necessary for the electronic message 114 from the adaptive content asset 140 according to the content rule 142. In other embodiments, instead of via the network 110, the content rule 142 can be physically delivered from the author A to an operator or business operating the content management computing device 104 so that the operator or business refers to the content rule 142 to generate the adaptive content 116 from the adaptive content asset 140. An example of the content rule 142 is illustrated and described with reference to FIG. 8.

At the operation 126, the content management computing device 104 sends a content locator 144 to the author computing device 102. The author computing device 102 receives the content locator 144 and includes the content locator 144 in the electronic message 114. The content locator 144 is configured to uniquely identify or refer to a source of the adaptive content 116 stored in the content management computing device 104. In at least one embodiment, the content locator 144 is a uniform resource locator (URL).

At the operation 128, the author computing device 102 sends the electronic message 114 to the recipient computing devices 106. The recipient computing device 106 receives the electronic message 114, and the recipient R can open the electronic message 114. As described below, the electronic message 114 includes the content locator 144 to obtain the appropriate adaptive content 116 so that the electronic message 114 is displayed with the adaptive content 116 to the recipient R.

At the operation 130, when the electronic message 114 is opened, the recipient computing device 106 sends a request (e.g., a content request 420 in FIG. 15) to the content management computing device 104 to obtain the adaptive content 116 (e.g., an adaptive content element 336 in FIG. 12) addressed by the content locator 144 from the content management computing device 104.

At the operation 132, the content management computing device 104 responds to the request from the recipient computing device 106 by sending an updated content locator 148 to the recipient computing device 106. The recipient computing device 106 receives the updated content locator 148 to locate the adaptive content 116 appropriate for the recipient R. Before the content management computing device 104 sends the updated content locator 148, the content management computing device 104 processes the request from the recipient computing device 106 to analyze the conditions or status associated with the recipient R, and then generates the updated content locator 148 according to the conditions or status of the recipient R. The updated content locator 148 then is configured to refer to the source of the adaptive content 116 (e.g., an adaptive content element 336 in FIG. 12) that satisfies the condition or status of the recipient R.

At the operation 134, the recipient computing device 106 resends a request to the content management computing device 104 to obtain the adaptive content 116 that meets the conditions or status of the recipient R.

At the operation 136, the content management computing device 104 responds to the request by sending the adaptive content 116 addressed by the updated content locator 148. The adaptive content 116 received by the recipient computing device 106 is displayed part of the electronic message 114 to the recipient R.

FIG. 3 illustrates an exemplary architecture of a computing device that can be used to implement aspects of the present disclosure, including, for example, the author computing device 102, the content management computing device 104, the recipient computing devices 106, and the third party data provider computing device 108, which will be collectively referred to herein as a computing device 156. One or more computing devices, such as the type illustrated in FIG. 3, are used to execute the operating system, application programs, and software modules (including the software engines) described herein.

The computing device 156 includes, in at least some embodiments, at least one processing device 158, such as a central processing unit (CPU). A variety of processing devices are available from a variety of manufacturers, for example, Intel or Advanced Micro Devices. In this example, the computing device 156 also includes a system memory 160, and a system bus 162 that couples various system components including the system memory 160 to the processing device 158. The system bus 162 is one of any number of types of bus structures including a memory bus or memory controller, a peripheral bus, and a local bus using any of a variety of bus architectures.

Examples of computing devices suitable for the computing device 156 include a desktop computer, a laptop computer, a tablet computer, a mobile phone device such as a smart phone, or other devices configured to process digital instructions.

The system memory 160 includes read only memory 164 and random access memory 166. A basic input/output system 168 containing the basic routines that act to transfer information within computing device 156, such as during start up, is typically stored in the read only memory 164.

The computing device 156 also includes a secondary storage device 170 in some embodiments, such as a hard disk drive, for storing digital data. The secondary storage device 170 is connected to the system bus 162 by a secondary storage interface 172. The secondary storage devices and their associated computer readable media provide nonvolatile storage of computer readable instructions (including application programs and program modules), data structures, and other data for the computing device 156.

Although the exemplary environment described herein employs a hard disk drive as a secondary storage device, other types of computer readable storage media are used in other embodiments. Examples of these other types of computer readable storage media include magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in secondary storage device 170 or memory 160, including an operating system 174, one or more application programs 176, other program modules 178, and program data 180. The data used by the computing device 156 may be stored at any location in the memory 160, such as the program data 180, or at the secondary storage device 170.

In some embodiments, computing device 156 includes input devices 182 to enable the caregiver to provide inputs to the computing device 156. Examples of input devices 182 include a keyboard 184, pointer input device 186, microphone 188, and touch sensor 190. A touch-sensitive display device is an example of a touch sensor. Other embodiments include other input devices 182. The input devices are often connected to the processing device 158 through an input/output interface 192 that is coupled to the system bus 162. These input devices 182 can be connected by any number of input/output interfaces, such as a parallel port, serial port, game port, or a universal serial bus. Wireless communication between input devices 182 and interface 192 is possible as well, and includes infrared, BLUETOOTH® wireless technology, 802.11a/b/g/n, cellular or other radio frequency communication systems in some possible embodiments.

In this example embodiment, a touch sensitive display device 194 is also connected to the system bus 162 via an interface, such as a video adapter 196. In some embodiments, the display device 194 is a touch sensitive display device. A touch sensitive display device includes sensor for receiving input from a user when the user touches the display or, in some embodiments, or gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 194, the computing device 156 can include various other peripheral devices (not shown), such as speakers or a printer.

When used in a local area networking environment or a wide area networking environment (such as the Internet), the computing device 156 is typically connected to the network through a network interface, such as a wireless network interface 198. Other possible embodiments use other communication devices. For example, some embodiments of the computing device 156 include an Ethernet network interface, or a modem for communicating across the network.

The computing device 156 typically includes at least some form of computer-readable media. Computer readable media includes any available media that can be accessed by the computing device 156. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 156. Computer readable storage media is an example of a computer readable data storage device.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In at least some embodiments of the computing device 156 that are used to implement aspects of the author computing device 102, the content management computing device 104, the recipient computing devices 106, and the third party data provider computing device 108, do not include all of the elements illustrated in FIG. 3.

Figure 4:
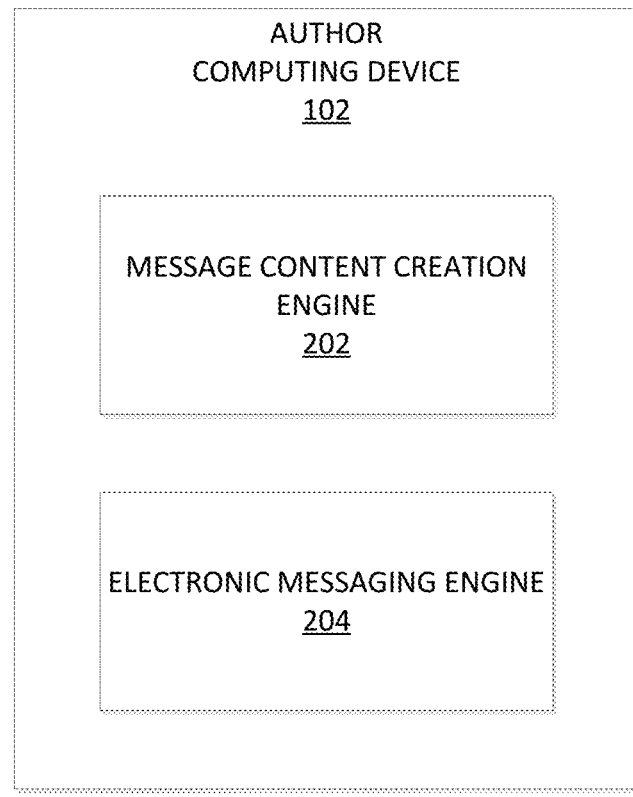
FIG. 4 illustrates an example author computing device.

FIG. 4 illustrates an example author computing device 102. In at least one embodiment, the author computing device 102 includes a message content creation engine 202 and an electronic messaging engine 204.

The author computing device 102 operates to allow the author A to create a set of message contents (e.g., an adaptive content asset 140, as illustrated in FIG. 7) that is possible contained in an electronic message 114. The author computing device 102 also operates to communicate with the content management computing device 104 to transmit the set of possible message contents to the content management computing device 104. The author computing device 102 is configured to transmit the electronic message 114 to one or more recipients R1 and R2 (collectively, R) through the network 110. As described below, the electronic message 114 includes one or more locators to uniquely identify at least one of the set of possible message contents transmitted to the content management computing device 104.

The message content creation engine 202 operates to create a message content 640 (FIG. 20) of the electronic message 114. In at least one embodiment, the message content creation engine 202 executes one or more software applications that the author A uses to create the message content 640. The message content creation engine 202 can provide an interface with which the author A manipulates the resources of the message content creation engine 202 to generate the message content 640. An example of the message content creation engine 202 is illustrated and described with reference to FIG. 5.

The electronic messaging engine 204 operates to compose the electronic message 114 and transmit the electronic message 114 to the recipient computing devices 106 through the network 110. In at least one embodiment, the electronic messaging engine 204 includes one or more software applications (e.g., email clients, web-based email applications, personal messaging programs, and text messaging programs) that allow the author A to access, manage, and send the electronic message 114.

Figure 5:
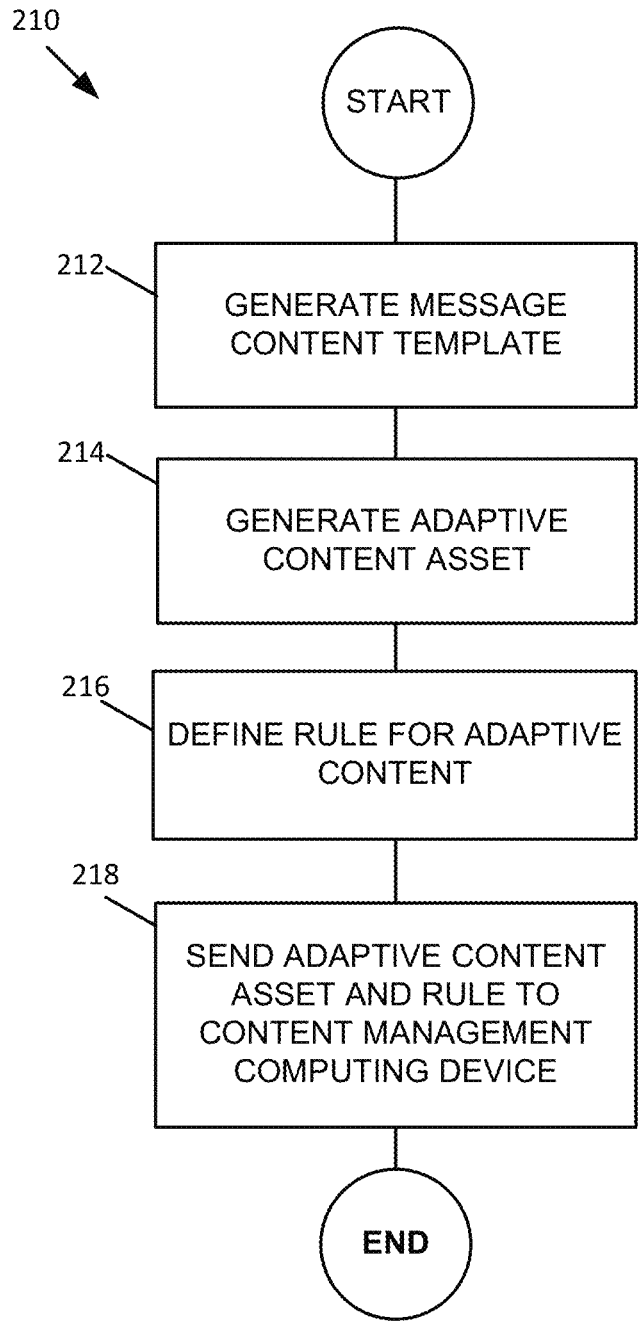
FIG. 5 is a flowchart illustrating an example method of operating a message content creation engine of the author computing device of FIG. 5.

FIG. 5 is a flowchart illustrating an example method 210 of operating the message content creation engine 202. In this example, the method 120 includes operations 212, 214, 216 and 218. The method 210 includes operations that are performed by one or more processors (such as the processing device 158, as depicted in FIG. 3).

Figure 6:
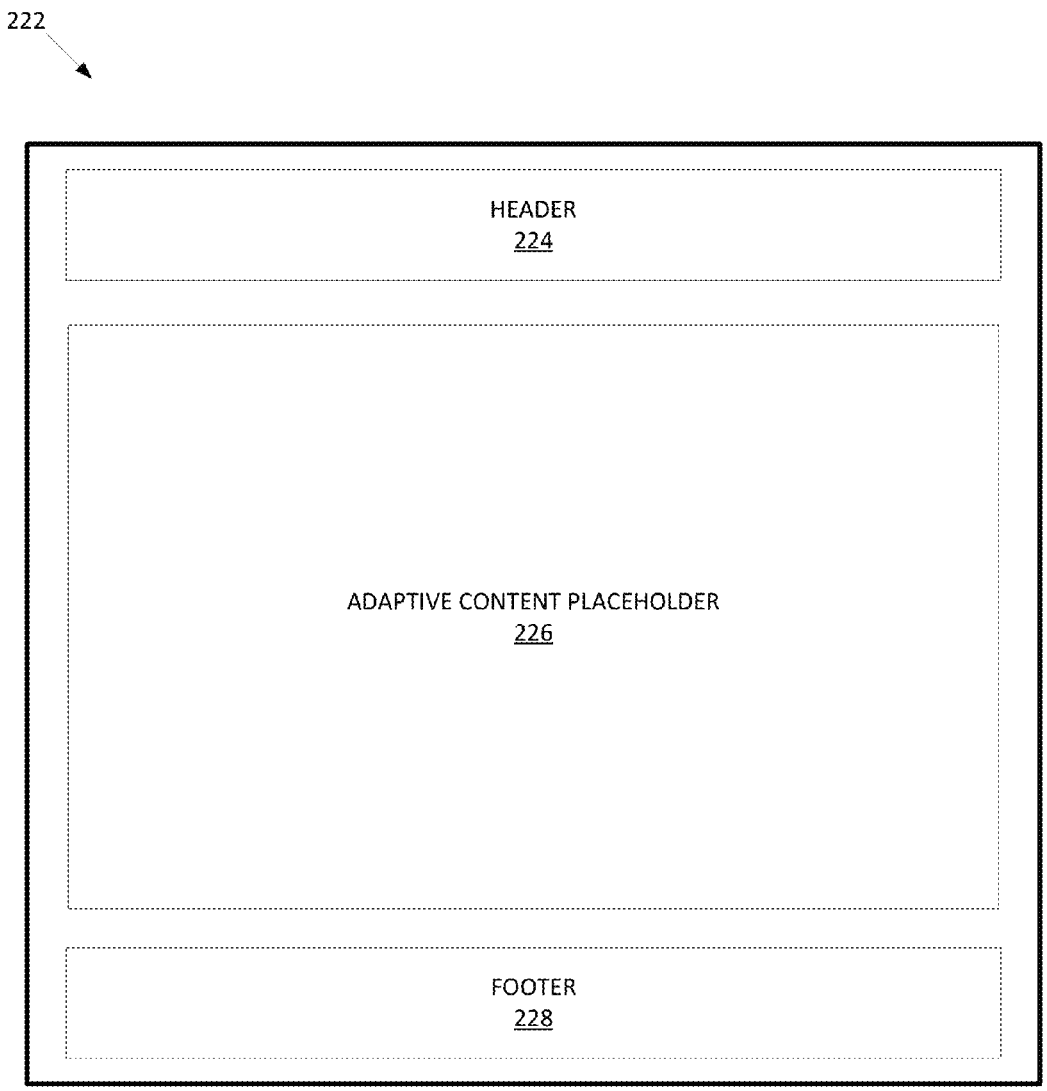
FIG. 6 is a schematic view of an example message content template.

At the operation 212, the message content creation engine 202 operates to generate a message content template 222 (FIG. 6). The message content template 222 is a preset format for the electronic message 114. An example message content template 222 is described and illustrated with reference to FIG. 6.

At the operation 214, the message content creation engine 202 operates to generate the adaptive content asset 140. An example adaptive content asset 140 is described and illustrated with reference to FIG. 7.

At the operation 216, the message content creation engine 202 operates to define the content rule 142, which is a rule for selecting the adaptive content 116 from the adaptive content asset 140. An example content rule 142 is described and illustrated with reference to FIG. 8.

At the operation 218, the message content creation engine 202 operates to send the adaptive content asset 140 and the content rule 142 to the content management computing device 104 for further process.

FIG. 6 is a schematic view of an example message content template 222. In at least one embodiment, the message content template 222 includes a header 224, an adaptive content placeholder 226, and a footer 228.

In at least one embodiment, the message content template 222 is created in text format, HyperText Markup Language (HTML) format, or any other format suitable for electronic messaging. The message content template 222 can include digital images in, for example, Bitmap (BMP), Graphics Interchange (GIF), Joint Photographic Expert Group (JPEG), Portable Network Graphics (PNG), Tagged Image File (TIF) formats.

The header 224 includes, in at least one embodiment, one or more fields about different information of the electronic message 114. Examples of the fields include the source of the author (which can be entitled "From"), the local time and date when the message is written or sent (which can be entitled "Date"), the source of the recipient (which can be entitled "To"), a brief summary of the topic of the message (which can be entitled "Subject"), a unique identifier for the message (which can be entitled "Message-ID"), and information about how the message is to be displayed (which can be entitled "Content-Type").

The adaptive content placeholder 226 provides a region on which the adaptive content 116 is located when the electronic message 114 is displayed on a display screen of the recipient computing device 106.

The footer 228 is a bottom section of the electronic message 114 and contains information that does not change from one electronic message to another. In at least one embodiment, the footer 228 includes the author's mailing address, direction, phone number, electronic contact address (e.g., e-mail address), website link, social network service link, unsubscribe link, copyright or trademark information, and disclaimer.

FIG. 7 is a schematic view of an example adaptive content asset 140. In at least one embodiment, the adaptive content asset 140 includes a customization content asset 232 and a standard content asset 234 including a background asset 236.

The adaptive content asset 140 is created by the author A using the author computing device 102 and contains all of the contents that can be selected and used for different electronic messages 114 sent to different recipients R. The adaptive content asset 140 can be made in text formats or in digital image formats, such as BMP, GIF, JPEG, PNG, and TIF.

The customization content asset 232 includes contents that can be selected for a customization content 650 (FIG. 20) in the adaptive content 116. The customization content asset 232 includes a plurality of contents that can satisfy all of the conditions or criteria identified in the content rule 142.

In at least one embodiment, each of the plurality of contents in the customization content asset 232 can include one or more content elements (e.g., 238A-C, 240A-C, and 242A-C) to demonstrate variations of the content. The content elements can be made with one or more texts and/or one or more digital images. In the depicted example, the customization content asset 232 includes weather contents 238, inventory contents 240, and time contents 242. The weather contents 238 include a plurality of weather content elements 238A, 238B, and 238C that can show all weather conditions that are available under the content rule 142. The inventory contents 240 include a plurality of inventory content elements (240A, 240B, and 240C) that can indicate all possible inventory status under the content rule 142. Similarly, the time contents 242 include a plurality of time content elements (242A, 242B, and 242C) that can show all possible time status under the content rule 142. As described below, according to a condition associated with the recipient R, the recipient computing device 106, and/or the received electronic message 114, the customization content 650 (FIG. 20) necessary for the electronic message 114 is determined based upon the content rule 142 and selected from the customization content asset 232.

The standard content asset 234 includes contents that can be selected for a standard content 654 (FIG. 20) in the adaptive content 116. As described below, the standard content 654 is a content that does not typically change by different conditions of the recipient R or the recipient computing device 106. One example of the standard content asset 234 includes the background asset 236.

The background asset 236 includes one or more contents that can be selected for a background content 652 (FIG. 20) in the adaptive content 116. As described below, the background content 652 provides a background frame or image for the standard content 654 and/or the customization content 650 in the adaptive content 116.

FIG. 8 illustrates an example content rule 142. In the depicted example, the content rule 142 is made in a form of table. Different types of the content rule 142 are available in other embodiments. The content rule 142 is configured to associate customization criteria 250 with content outputs 252.

The customization criteria 250 indicate conditions or status of, for example, the recipient R, the recipient computing device 106, and/or the electronic message 114 received by the recipient computing device 106. The customization criteria 250 determine the contents from the adaptive content asset 140, which are necessary to generate the adaptive content 116. Example factors of the customization criteria 250 include a local time of the recipient R (or the recipient computing device 106), a location of the recipient R (or the recipient computing device 106), and a program that the recipient computing device 106 uses to receive, display, and manage the electronic message 114. Other factors can be used in addition to, or alternatively to, the above factors.

The content output 252 indicates the contents (e.g., 238, 240, 242) or the content elements (e.g., 238A-C, 240A-C, 242A-C) selected from the adaptive content asset 140, which correspond to the associated customization criteria 250. The content output 252 includes the standard content 654, the customization content 650, and the background content 652. The content outputs 252 are different depending on different combinations of the factors of the customization criteria 250.

Figure 9:
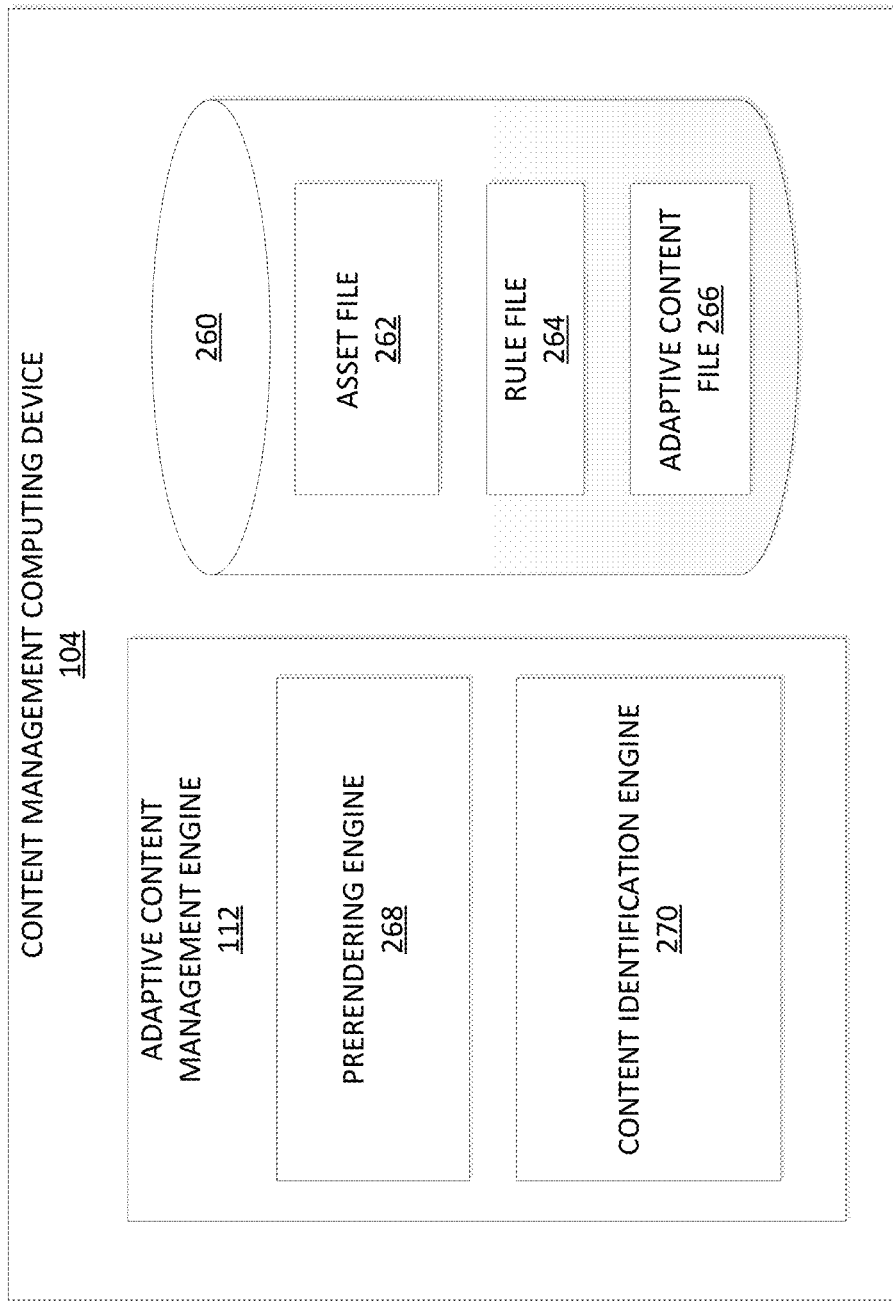
FIG. 9 illustrates an example content management computing device.

FIG. 9 illustrates an example content management computing device 104. In addition to the adaptive content management engine 112, the content management computing device 104 includes a database 260. The database 260 includes an asset file 262, a rule file 264, and an adaptive content file 266. The adaptive content management engine 112 includes a pre-rendering engine 268 and a content identification engine 270.

The content management computing device 104 operates to communicate with the author computing device 102 to receive the adaptive content asset 140 and the content rule 142 from the author computing device 102. The content management computing device 104 also operates to communicate with the recipient computing devices 106 to receive a request for adaptive content in the electronic message 114 and transmit the requested adaptive content (e.g., the requested adaptive content element 336) to the recipient computing devices 106.

The asset file 262 is configured to store the adaptive content asset 140 transmitted from the author computing device 102 to the content management computing device 104.

The rule file 264 is configured to store the content rule 142 received from the author A or the author computing device 102. The rule file 264 further includes references to one or more content elements 336 (FIG. 12) appropriate for the adaptive content 116 (e.g., the customization content 650) to locate the content elements 336 stored as part of the adaptive content file 266 in the database 260. In at least one embodiment, the content elements 336 are text files and/or image files. Each content element 336 can be uniquely located by a content locator, such as a URL. An example of the rule file 264 is illustrated and described with reference to FIG. 11.

The adaptive content file 266 is configured to store the content elements 366 that are only necessary to fulfill all of the customization criteria 250 listed in the content rule 142. Thus, the adaptive content file 266 does not include content elements 366 that are not used to generate the adaptive content 116 under the content rule 142. Although the adaptive content file 266 is depicted as being separate from the asset file 262 in the depicted example, the adaptive content file 266 can be part of the asset file 262 in other embodiments. In yet other embodiments, the content management computing device 104 can be configured to operate in a similar manner without the adaptive content file 266 in the database 260. An example of the adaptive content file 266 is illustrated and described with reference to FIG. 12.

The pre-rendering engine 268 is configured to communicate with the author computing device 102 to receive the adaptive content asset 140 and the content rule 142. The pre-rendering engine 268 further operates to determine adaptive content elements 336 necessary for generating all of the possible adaptive content 116 based upon the content rule 142 and send the content locator 144 to the author computing device 102. An example operation of the pre-rendering engine 268 is described and illustrated in FIG. 10.

The content identification engine 270 operates to locate the content elements necessary for the adaptive content 116 upon request from the recipient computing device 106 and send an updated content locator 148 to the recipient computing device 106 so that the recipient computing device 106 sends a request again to the content management computing device 104 to obtain the adaptive content 116 appropriate to the recipient R. An example of the content identification engines is illustrated and described with reference to FIGS. 13-15.

In the depicted example, the database 260 is included in the content management computing device 104. In other embodiments, however, the database 260 can be located in other locations than the content management computing device 104. Examples of the other locations include one or more cloud computing devices.

Figure 10:
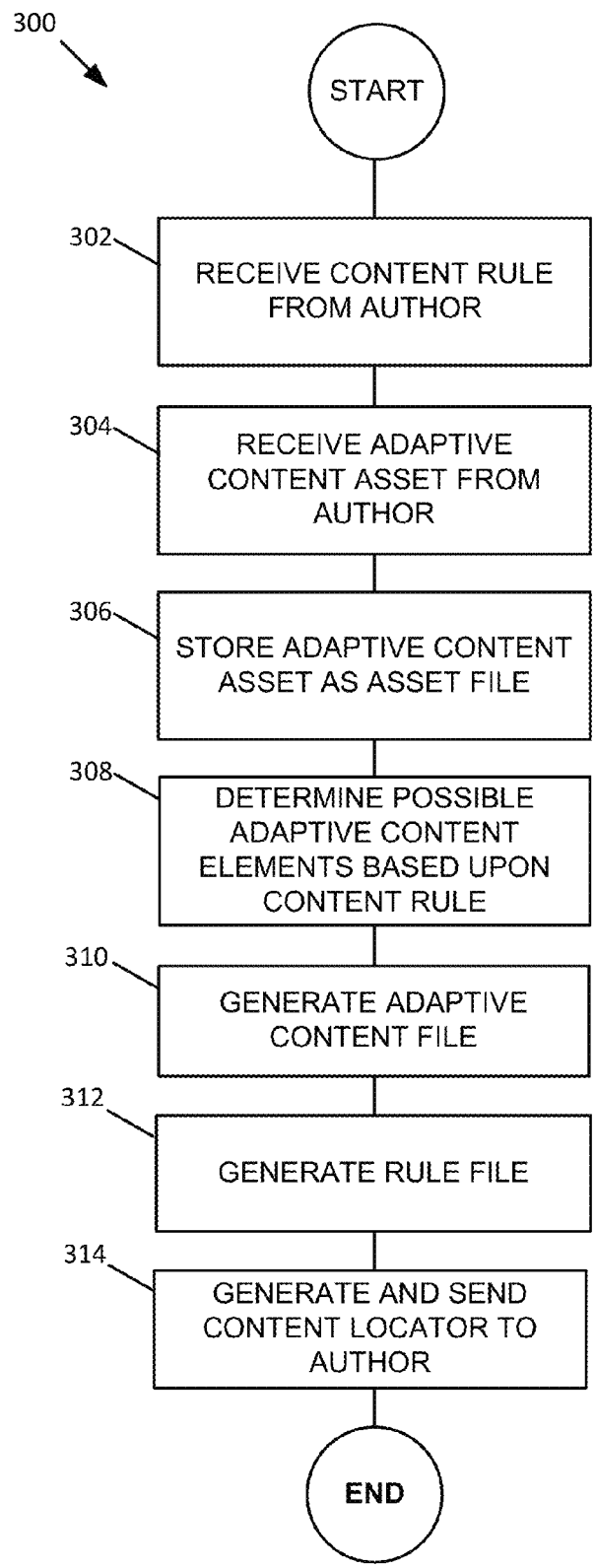
FIG. 10 is a flowchart illustrating an example method of operating the pre-rendering engine of the content management computing device of FIG. 9.

FIG. 10 is a flowchart illustrating an example method 300 of operating the pre-rendering engine 268. In this example, the method 300 includes operations 302, 304, 306, 308, 310, 312 and 314. The method 300 includes operations that are performed by one or more processors (such as the processing device 158, as depicted in FIG. 3).

As described above, in at least some embodiments all of the adaptive content elements 336 necessary for generating all of the possible adaptive content 116 are created as the adaptive content asset 140 by the author computing device 102 and sent to the pre-rendering engine 268 before receiving a request for an adaptive content 116 from the recipient computing device 106. The pre-rendering engine 268 operates to receive the adaptive content asset 140 (including the group of the adaptive content elements 336) and sort out the adaptive content elements 336 of the adaptive content asset 140 into the adaptive content file 226 based upon the content rule 142. As such, the adaptive content elements 336 used in the adaptive content 116 are pre-rendered and stored before receiving a request for the an adaptive content 116 from the recipient computing device 106, and are not rendered in real-time after such a request from the recipient computing device 106. In particular, upon receiving the request for an adaptive content 116 from the recipient computing device 106, the adaptive content management engine 112 neither generates new images, nor updates images, for an adaptive content 116. The adaptive content management engine 112 operates to pre-render all adaptive content elements (e.g., images) in advance, and merely locates at least one of the adaptive content elements 336 as necessary.

At the operation 302, the pre-rendering engine 268 operates to receive the content rule 142 from the author computing device 102. In at least one embodiment, the content rule 142 can be transmitted from the author computing device 102 to the content management computing device 104 through the network 110. In other embodiments, a business entity or operator of the content management computing device 104 can physically receive the content rule 142 from the author A.

At the operation 304, the pre-rendering engine 268 operates to receive the adaptive content asset 140 from the author computing device 102. In at least one embodiment, the adaptive content asset 140 can be transmitted from the author computing device 102 to the content management computing device 104 through the network 110. In other embodiments, the business entity or operator of the content management computing device 104 can physically receive the content rule 142 from the author A.

At the operation 306, the pre-rendering engine 268 operates to store the received adaptive content asset 140 as the asset file 262 in the database 260.

At the operation 308, the pre-rendering engine 268 operates to determine adaptive content elements 336 that can be used to generate the adaptive content 116. The adaptive content elements 336 are selected from the asset file 262 based upon the content rule 142. The adaptive content elements 336 include all text files and/or image files that are selectively used in the adaptive content 116.

At the operation 310, the pre-rendering engine 268 operates to generate the adaptive content file 266 with the selected adaptive content elements 336. For example, the selected adaptive content elements 336 are stored as the adaptive content file 266 in the database 260.

At the operation 312, the pre-rendering engine 268 operates to generate the rule file 264. The rule file 264 includes the content rule 142 and references to the adaptive content elements 336 in the adaptive content file 266. The rule file 264 is referred to by the content identification engine 270 to locate the adaptive content elements 336 in the adaptive content file 266 as necessary to generate the adaptive content 116.

At the operation 314, the pre-rendering engine 268 operates to generate the content locator 144 and send the content locator 144 to the author computing device 102. The author computing device 102 can incorporate the content locator 144 in the electronic message 114 so that the electronic message 114 is displayed with the adaptive content 116 addressed by the content locator 144.

FIG. 11 illustrates an example rule file 264. In the depicted example, the rule file 264 is illustrated as a data structure in a form of table. In other embodiments, the rule file 264 includes a plurality of tables. In yet other embodiments, different types of the rule file 264 are available. The content rule 142 is configured to include the customization criteria field 320 and the content ID field 322 and map the customization criteria field 320 to the content ID field 322.

The customization criteria field 320 is configured to store data that uniquely identify the values or status of each of the customization criteria. The customization criteria 320 include one or more factors associated with, for example, the recipient R, the recipient computing device 106, and/or the electronic message 114 received by the recipient computing device 106. The customization criteria 320 include the customization criteria 250 in the content rule 142. Example factors of the customization criteria 320 include a local time of the recipient R (or the recipient computing device 106), a location of the recipient R (or the recipient computing device 106), and a program that the recipient computing device 106 uses to receive, display, and manage the electronic message 114. Other factors can be used in addition to, or alternatively to, the above factors.

The content ID field 322 is configured to store data to uniquely identify a particular adaptive content element 336. The content ID field 322 stores data that reference the adaptive content elements 336 according to the given customization criteria 320.

Figure 12:
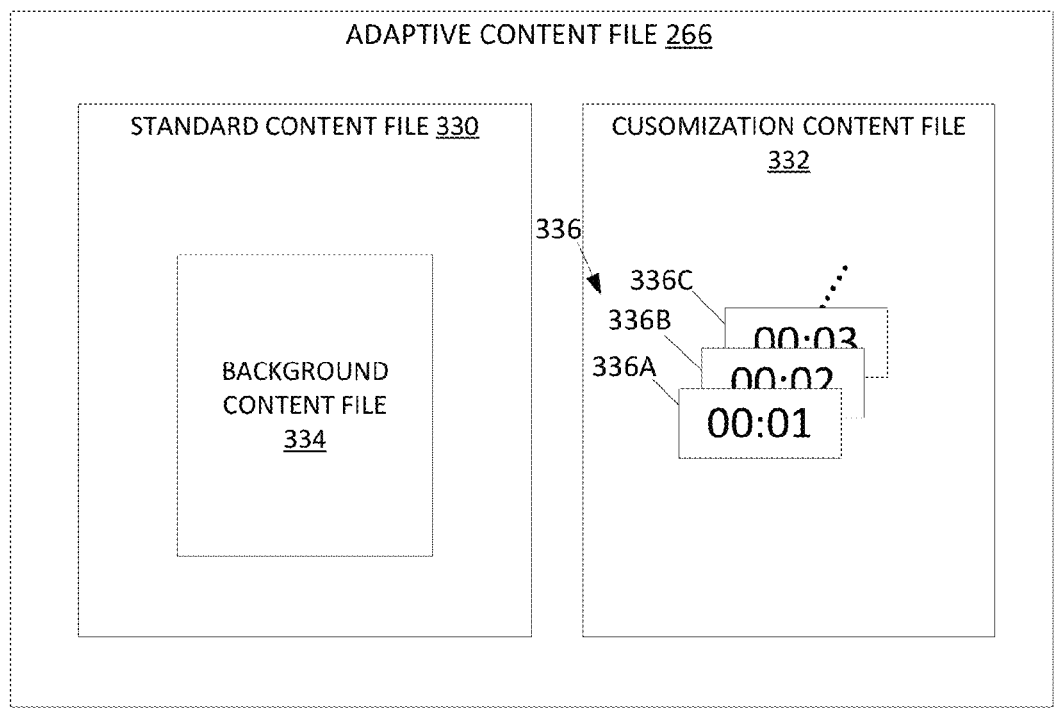
FIG. 12 illustrates an example adaptive content file.

FIG. 12 illustrates an example adaptive content file 266. In the depicted example, the adaptive content file 266 stores a standard content file 330 and a customization content file 332.

The standard content file 330 includes content elements that can be used to generate the standard content 654 in the adaptive content 116. The content elements of the standard content file 330 are selected from the standard content asset 234 so that the selected content elements of the standard content file 330 satisfy all of the conditions identified in the rule file 264. The standard content 654 does not typically change by different recipients R or recipient computing devices 106. The standard content file 330 can include a background content file 334. The background content file 334 includes content elements that can be used to generate a background content 652 in the adaptive content 116. The content elements of the background content file 334 are selected from the background asset 236 so that the selected content elements satisfy all of the conditions identified in the rule file 264.

The customization content file 332 includes a plurality of adaptive content elements 336 (e.g., 336A-C). The adaptive content elements 336 are selected from the customization content asset 232 so that the selected adaptive content elements 336 satisfy all of the conditions identified in the rule file 264. Based upon the conditions in the rule file 264, at least a portion of the adaptive content elements 336 are used to generate the customization content 650 in the adaptive content 116. As described below, the content identification engine 270 operates to refer to the rule file 264 to locate the adaptive content elements 336 according to a particular condition among the customization criteria 320. As located, at least some of the adaptive content elements 336 are selected and transmitted to the recipient computing device 106 for displaying the adaptive content 116 to the recipient R.

Figure 13:
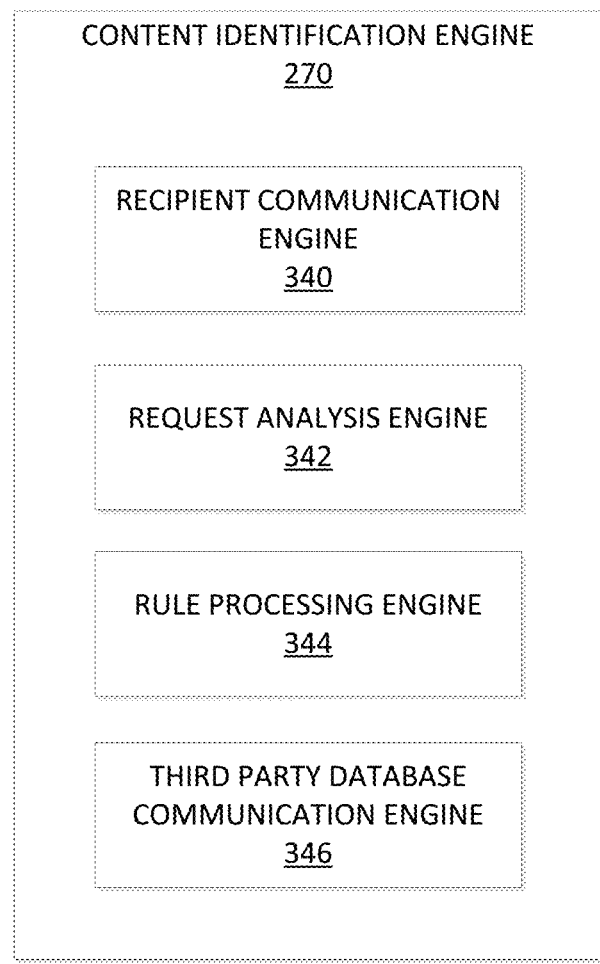
FIG. 13 illustrates an example content identification engine of the content management computing device of FIG. 9.

FIG. 13 illustrates an example content identification engine 270. In at least one embodiment, the content identification engine 270 includes a recipient communication engine 340, a request analysis engine 342, a rule processing engine 344, and a third party database communication engine 346.

The recipient communication engine 340 is configured to communicate with the recipient computing devices 106. The recipient communication engine 340 can operate to receive a request for the adaptive content 116 from the recipient computing devices 106. The recipient communication engine 340 can send the adaptive content elements 446, which are selected based upon the request, to the recipient computing device 106 that has originally sent the request. The recipient communication engine 340 can also transmit a content locator (e.g., the content locator 144 and the updated content locator 148) to the recipient computing devices 106.

The request analysis engine 342 operates to analyze the request from the recipient computing devices 106. The request analysis engine 342 operates to parse the request from the recipient computing devices 106 and identify the factors and/or the conditions of the recipient R, the recipient computing device 106, etc. For example, the request analysis engine 342 can analyze the request and determine a local time, a location, a program used in the recipient computing device 106, etc.

The rule processing engine 344 operates to refer to the rule file 264 and locate the adaptive content elements 336 that satisfy the condition identified in the rule file 264. The rule processing engine 344 can also generate the updated content locator 148, which uniquely identifies the located adaptive content elements 336. As described, the updated content locator 148 is transmitted to the recipient computing device 106 so that the recipient computing device 106 can utilize the updated content locator 148 to generate and display the adaptive content 116.

The third party database communication engine 346 operates to communicate with the third party data provider computing device 108. The third party database communication engine 346 can send a request for additional data or contents to the third party data provider computing device 108. Such additional data or contents can be used as part of the adaptive content 116 (e.g., the customization content 650). Further, the additional data or contents can be used as part of the customization criteria 250 or 320 to determine a particular adaptive content element 336. In at least one embodiment, the request for additional data or contents includes one or more of the conditions or factors identified by the request analysis engine 342, as described above. When the third party data provider computing device 108 processes the request and respond with the additional information associated with the conditions, the third party database communication engine 346 can operate to receive the information and provide it to other engines as necessary, such as the request analysis engine 342 and the rule processing engine 344.

Figure 14:
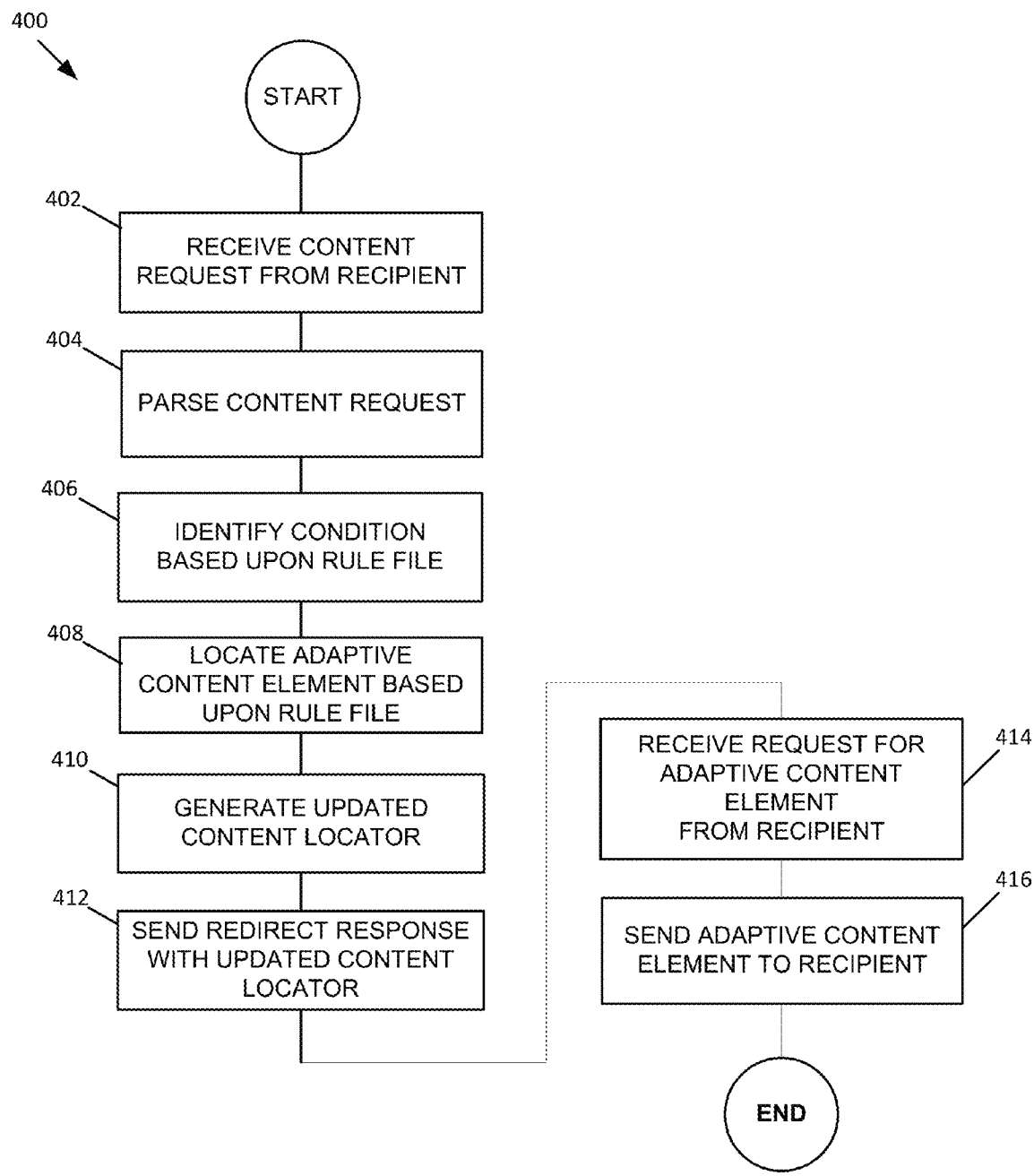
FIG. 14 is a flowchart illustrating an example method of operating the content identification engine of FIG. 13.

FIG. 14 is a flowchart illustrating an example method 400 of operating the content identification engine 270. In this example, the method 400 includes operations 402, 404, 406, 408, 410, 412, 414, and 416. The method 400 includes operations that are performed by one or more processors (such as the processing device 158, as depicted in FIG. 3).

At the operation 402, the content identification engine 270 operates to receive a content request 420 (FIG. 15) for the adaptive content 116 from the recipient computing device 106. An example of the content request 420 is described and illustrated with reference to FIG. 15. In at least one embodiment, the operation 402 can be performed by the recipient communication engine 340 as described in FIG. 13.

At the operation 404, the content identification engine 270 operates to parse the content request 420. In particular, the content identification engine 270 analyzes the syntactic parts of the content request 420. For example, the content identification engine 270 identifies elements included in a header 426 (FIG. 15) of the content request 420. Such elements are used to determine the status or factors of the recipient R (or the recipient computing device 106). Examples of the elements include an IP address, a local time, and a user agent of the recipient R (or the recipient computing device 106). In at least one embodiment, the operation 404 can be performed by the request analysis engine 342 of the content identification engine 270, as described in FIG. 13.

At the operation 406, the content identification engine 270 operates to identify the condition or criterion of the recipient R (or the recipient computing device 106) based upon the rule file 264. For example, the content identification engine 270 refers to the rule file 264 and operates to find a condition that meets the status or factors identified at the operation 404.

At the operation 408, the content identification engine 270 operates to locate an adaptive content element 336 based upon the rule file 264. Once the content identification engine 270 finds a condition associated with the identified status or factors of the recipient R at the operation 406, the content identification engine 270 can find the adaptive content element 336 corresponding to the status or factors from the rule file 264.

At the operation 410, the content identification engine 270 operates to generate an updated content locator 148 that uniquely identifies the location of the identified adaptive content element 336. The updated content locator 148 can be of any type. One example type of the updated content locator 148 is a uniform resource locator (URL).

In at least one embodiment, the operations 406, 408, and 410 can be performed by the rule processing engine 344 of the content identification engine 270, as described in FIG. 13.

At the operation 412, the content identification engine 270 operates to compose and send a redirect response 440 to the recipient computing device 106. The redirect response 440 includes the updated content locator 148. An example of the redirect response 440 is illustrated and described with reference to FIG. 16. As described, when the recipient computing device 106 receives the redirect response 440 with the updated content locator 148, the recipient computing device 106 sends another request (i.e., a second request) 422 for the adaptive content element 336 identified at the operation 408 to the content management computing device 104. The second request 422 includes the updated content locator 148.

At the operation 414, the content identification engine 270 operates to receive the second request 422 for the adaptive content element 336 from the recipient computing device 106. As described, the second request 422 includes the updated content locator 148, which uniquely identifies the associated adaptive content element 336. Other than the updated content locator 148, the second request 422 can be identical to the original content request 420.

At the operation 416, the content identification engine 270 operates to send, to the recipient computing device 106, the adaptive content element 336 addressed by the updated content locator 148.

In at least one embodiment, the operations 412, 414, and 416 can be performed by the recipient communication engine 340 of the content identification engine 270, as described in FIG. 13.

As such, the adaptive content element 336 is located from the existing adaptive content file 266, which includes a plurality of possible adaptive content elements 336, to customize the electronic message 114 for each Recipient R. The adaptive content element 336 is selected based upon conditions that are associated with the status or factors of the recipient R and found from the rule file 264. In particular, in at least some embodiments the adaptive content element 336 is not generated or updated in real-time upon the content request, but selected from the existing pool of the adaptive content elements 336 (i.e., the adaptive content file 226) upon the content request. This process, as described as the method 400 or 500 (FIG. 17), can be performed faster and more efficiently than a method of generating or updating images in the electronic message in real-time when the message is opened or accessed. The inventors have found, and were surprised to learn, that such real-time processing requires more time and processing resources to generate or update images after a request is received, which can result in an undesirable delay in providing the images, than to pre-generate all of the various possible images in advance and to simply provide locators to the particular one or more images when needed. In contrast, the methods 400 and 500 as described herein only need to transmit one or more requests containing locators and locate necessary adaptive content elements (e.g., images) based upon the requests because the images are pre-rendered before the request is received. Although the methods 400 and 500 can use more storage space to store all of the possible pre-rendered adaptive content elements 336, the cost of the digital storage space is minimal, and is offset by the reduced processing requirements and improved performance that is obtained.

Figure 15:
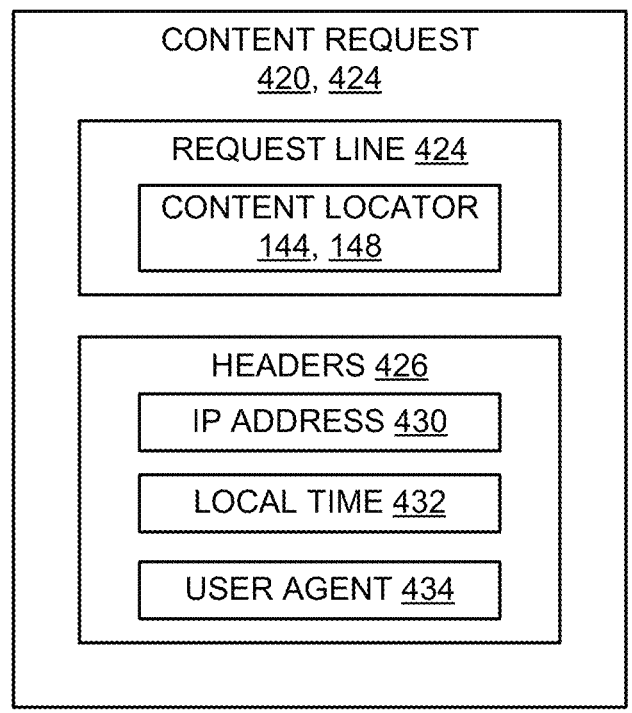
FIG. 15 illustrates an example content request.

FIG. 15 illustrates an example content request 420 and 422. In at least some embodiment, the content request 420 and 422 can be of a HTTP format. The content request 420 and 422 can include a request line 424 and a header 426.

The request line 424 can include a content locator, such as the content locator 144 and the updated content locator 148. In at least one embodiment, the content locator 144 and 148 can be a uniform resource locator (URL).

The header 426 can include the information about the recipient R (or the recipient computing device 106). For example, the header 426 can include an IP address 430 of the recipient computing device 106, a local time 432 at the recipient computing device 106, and a user agent 434 of the recipient computing device 106.

The information in the header 426 can be used to identify the status of the recipient computing device 106 so as to determine a condition or criterion for locating an appropriate adaptive content element 336 based upon the rule file 264. For example, the IP address 430, the local time 432, and the user agent 434 can be used to identify the location and time (or time zone) of the recipient R and the massaging application or program that the recipient R is using in the recipient computing device 106. The IP address 430 can be used to identify a location of the recipient computing device 106. In at least one embodiment, the content management computing device 104 can communicate with the third party data provider computing device 108 to obtain the location and/or local time (or time zone) of the recipient computing device 106 based upon the IP address 430 of the recipient computing device 106. The user agent 434 can provide, for example, a software application, a device executing the software application, and/or an operating system of the recipient computing device 106.

In other embodiments, the local time of the recipient R can be obtained from a third party server computing device, such as an Internet service provider (ISP) that the recipient R uses for data communication. For example, a local time code provided from the third party server computing device can be used, along with geolocation information of the recipient computing device 106, to obtain a local time and/or a time zone of the recipient R (or the recipient computing device 106). Alternatively, the local time and/or the time zone of the recipient R can be estimated from the IP address 430 of the recipient computing device 106 and/or from the location associated with the IP address 430.

Figure 16:
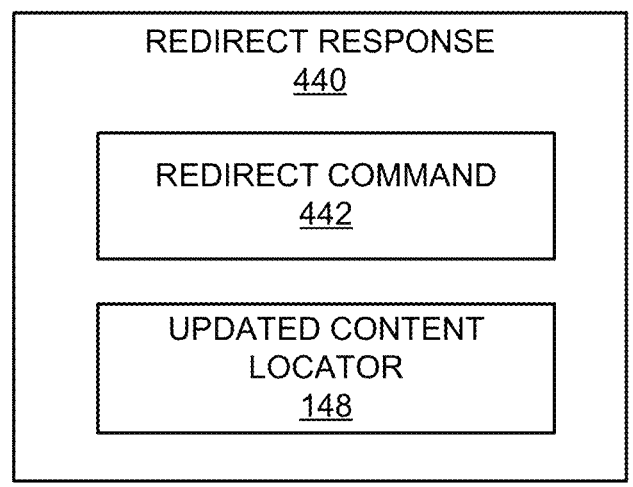
FIG. 16 illustrates an example redirect response.

FIG. 16 illustrates an example redirect response 440. In at least one embodiment, the redirect response 440 includes a redirect command 442 as well as the updated content locator 148.

The redirect command 442 is configured to prompt the recipient computing device 106 (e.g., the user agent of the recipient computing device 106) to make the second request 422 with the updated content locator 148.

In at least one embodiment, the redirect response 440 can be a HTTP response with 302 (or "302 Found") status code (i.e., a HTTP 302 response). The HTTP 302 response is configured to provide an updated URL so that the user agent is invited by this response to make a second, otherwise identical, request to the updated URL. The user agent then performs a temporary redirect.

Figure 17:
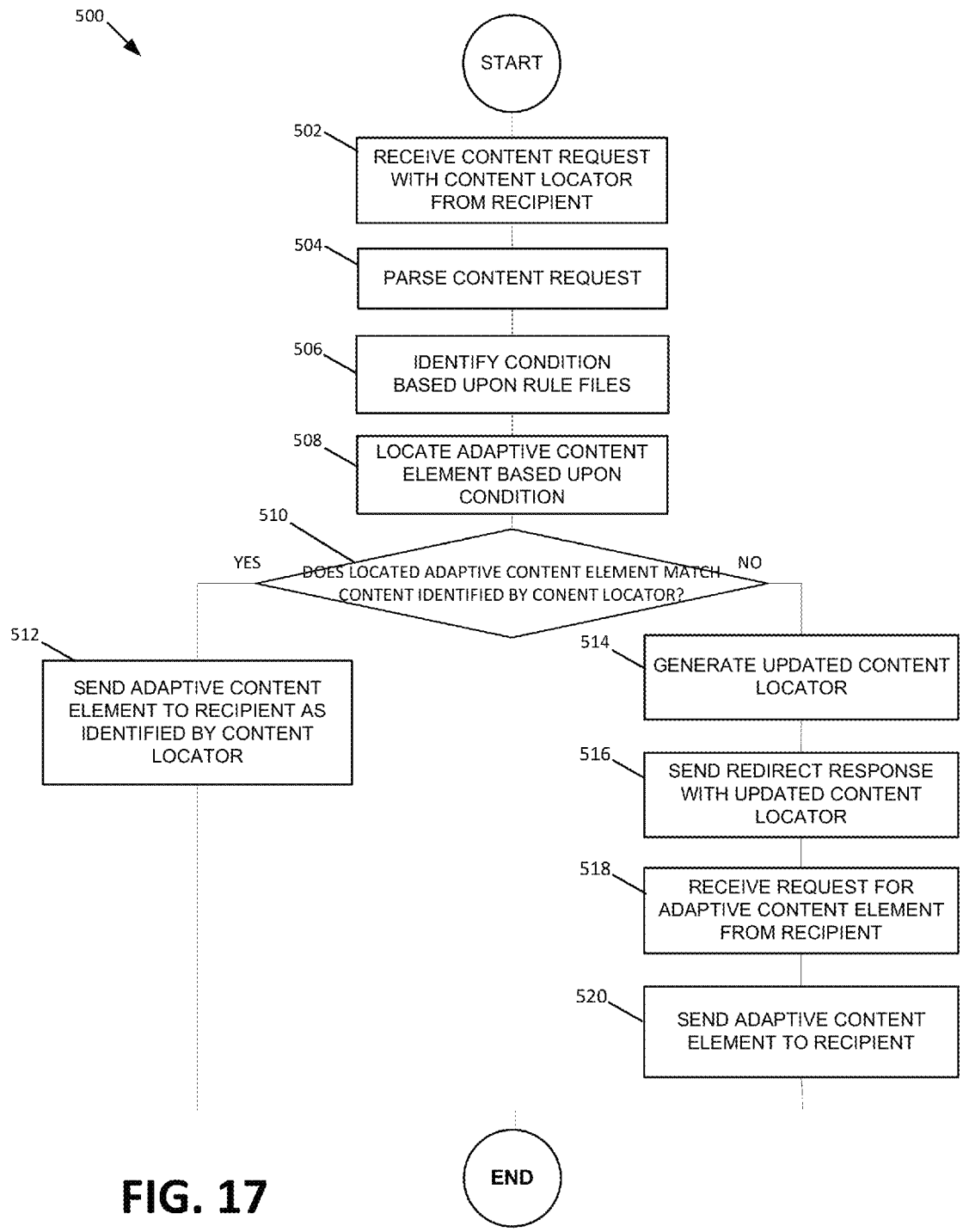
FIG. 17 is a flowchart illustrating another example method of operating the content identification engine of FIG. 13.

FIG. 17 is a flowchart illustrating another example method 500 of operating the content identification engine 270. In this example, the method 500 includes operations 502, 504, 506, 508, 510, 512, 514, 516, 518 and 520. The method 500 includes operations that are performed by one or more processors (such as the processing device 158, as depicted in FIG. 3).

At the operation 502, the content identification engine 270 operates to receive a content request 420 (FIG. 15) for the adaptive content 116 from the recipient computing device 106. In at least one embodiment, the operation 502 can be performed by the recipient communication engine 340 as described in FIG. 13.

At the operation 504, the content identification engine 270 operates to parse the content request 420. In particular, the content identification engine 270 analyzes the syntactic parts of the content request 420. For example, the content identification engine 270 identifies elements included in the header 426 of the content request 420. Such elements are used to determine the status or factors of the recipient R (or the recipient computing device 106). Examples of the elements include an IP address, a local time, and a user agent of the recipient R (or the recipient computing device 106). In at least one embodiment, the operation 504 can be performed by the request analysis engine 342 of the content identification engine 270, as described in FIG. 13.

At the operation 506, the content identification engine 270 operates to identify the condition or criterion of the recipient R (or the recipient computing device 106) based upon the rule file 264. For example, the content identification engine 270 refers to the rule file 264 and operates to find a condition that meets the status or factors identified at the operation 504.

At the operation 508, the content identification engine 270 operates to locate an adaptive content element 336 based upon the rule file 264. Once the content identification engine 270 finds a condition associated with the identified status or factors of the recipient R at the operation 406, the content identification engine 270 can find the adaptive content element 336 corresponding to the status or factors from the rule file 264.

At the operation 510, the content identification engine 270 determines whether the located adaptive content element 336 matches a content element addressed by the original content locator 144. If the located adaptive content element 336 is identical to the content element identified by the content locator 144 ("YES" at the operation 510), the method 500 continues at the operation 512. Otherwise ("NO" at the operation 510), the method 500 proceeds to the operation 514.

In at least one embodiment, the operations 506, 508, and 510 can be performed by the rule processing engine 344 of the content identification engine 270, as described in FIG. 13.

At the operation 512, the content identification engine 270 sends the identified adaptive content element 336 to the recipient computing device 106 so that the content element 336 is displayed as part of the electronic message 114. In at least one embodiment, the operation 512 can be performed by the recipient communication engine 340 of the content identification engine 270, as described in FIG. 13.

At the operation 514, the content identification engine 270 operates to generate an updated content locator 148 that uniquely identifies the location of the identified adaptive content element 336. The updated content locator 148 can be of any type. One example type of the updated content locator 148 is a uniform resource locator (URL). In at least one embodiment, the operation 514 can be performed by the rule processing engine 344 of the content identification engine 270, as described in FIG. 13.

At the operation 516, the content identification engine 270 operates to compose and send a redirect response 440 to the recipient computing device 106. The redirect response 440 includes the updated content locator 148. As described, when the recipient computing device 106 receives the redirect response 440 with the updated content locator 148, the recipient computing device 106 sends another request (i.e., a second request) 422 for the adaptive content element 336 identified at the operation 408 to the content management computing device 104. The second request 422 includes the updated content locator 148.

At the operation 518, the content identification engine 270 operates to receive the second request 422 for the adaptive content element 336 from the recipient computing device 106. As described, the second request 422 includes the updated content locator 148, which uniquely identifies the associated adaptive content element 336. Other than the updated content locator 148, the second request 422 can be identical to the original content request 420.

At the operation 520, the content identification engine 270 operates to send, to the recipient computing device 106, the adaptive content element 336 addressed by the updated content locator 148.

In at least one embodiment, the operations 516, 518, and 520 can be performed by the recipient communication engine 340 of the content identification engine 270, as described in FIG. 13.

Figure 18:
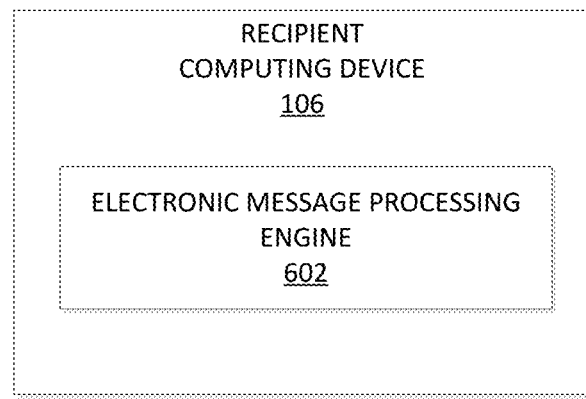
FIG. 18 illustrates an example recipient computing device.

FIG. 18 illustrates an example recipient computing device 106. In at least one embodiment, the recipient computing device 106 includes an electronic message processing engine 602.

The recipient computing devices 106 operate to receive the electronic message 114 from the author computing device 102 and provide an interface for recipients R to open the electronic message 114. The recipient computing devices 106 are also configured to interact with the content management computing device 104 to request and receive the adaptive content 116 (e.g., the adaptive content element 336) associated with the received electronic message 114

The electronic message processing engine 602 is configured to receive, display, and manage the electronic message 114. The electronic message processing engine 602 can provide an interface through which the recipient R can interact with the received electronic message 114. In at least one embodiment, the electronic message processing engine 602 includes a user client, such as a web browser, an email program, and other electronic messaging software programs, executed in the recipient computing device 106.

Figure 19:
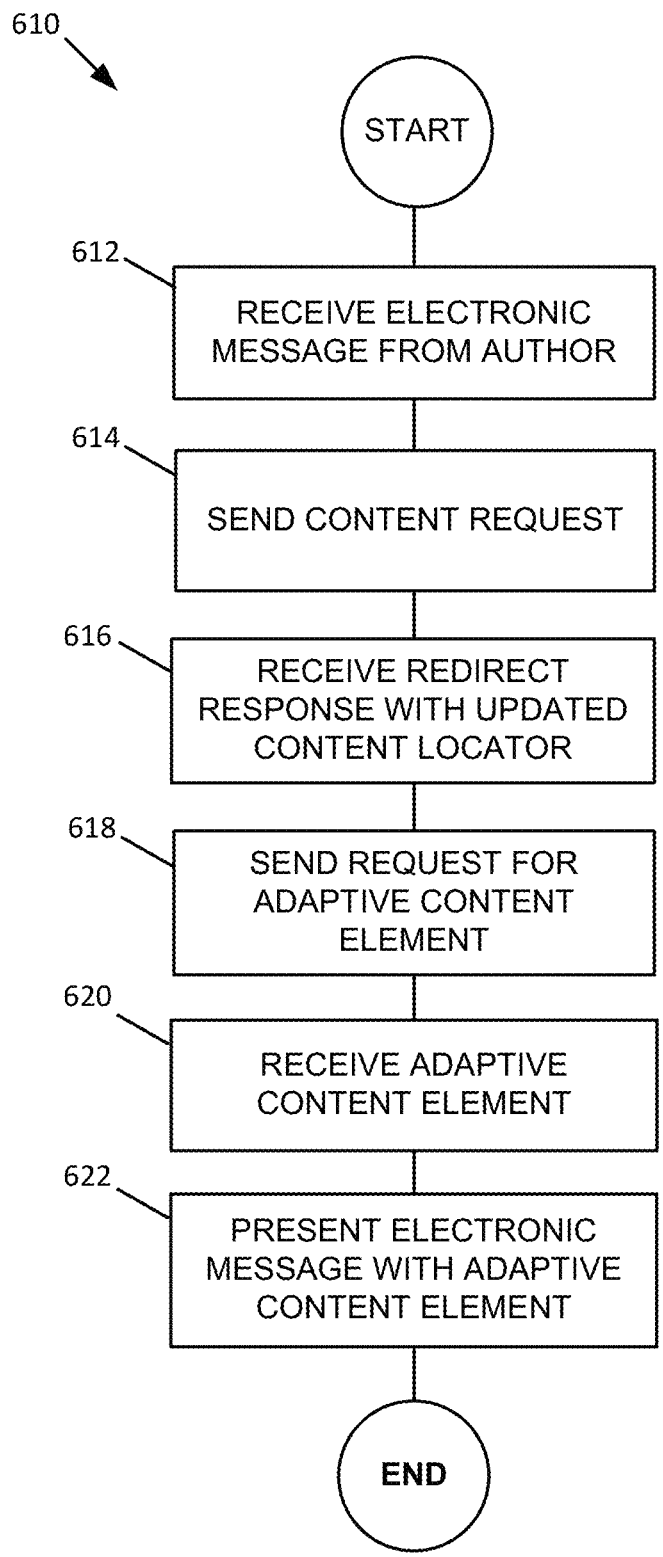
FIG. 19 is a flowchart illustrating another example method of operating a recipient computing device.

FIG. 19 is a flowchart illustrating another example method 610 of operating the recipient computing device 106 (e.g., the electronic message processing engine 602). In this example, the method 610 includes operations 612, 614, 616, 618, 620, and 622. The method 610 includes operations that are performed by one or more processors (such as the processing device 158, as depicted in FIG. 3).

At the operation 612, the recipient computing device 106 operates to receive the electronic message 114 from the author computing device 102.

At the operation 614, the recipient computing device 106 operates to send the content request 420 to the content management computing device 104. In at least one embodiment, the content request 420 is sent to the content management computing device 104 when the recipient R accesses and opens the electronic message 114. As described above, the content request 420 includes the original content locator 144 addressed to a source of the adaptive content 116.

At the operation 616, the recipient computing device 106 operates to receive the redirect response 440, which includes the updated content locator 148. As described above, the redirect response 440 is sent from the content management computing device 104 to the recipient computing device 106 after the content management computing device 104 determines a particular condition of the recipient R (or the recipient computing device 106) and generates the updated content locator 148.

At the operation 618, the recipient computing device 106 operates to send the second request 422 for an appropriate adaptive content element 336. The second request 422 includes the updated content locator 148 received at the operation 616. The updated content locator 148 identifies a source of the adaptive content element 336 appropriate for the recipient R.

At the operation 620, the recipient computing device 106 operates to receive the adaptive content element 336 addressed by the updated content locator 148.

At the operation 622, the recipient computing device 106 can include the received adaptive content element 336 in the electronic message 114 and display the electronic message 114 to the recipient R. In at least some embodiments the received adaptive content element 336 is displayed only within the electronic message 114 as described herein. In at least some embodiments, the adaptive content elements 336 are not accessible as a webpage through, for example, a web browser.

Figure 20:
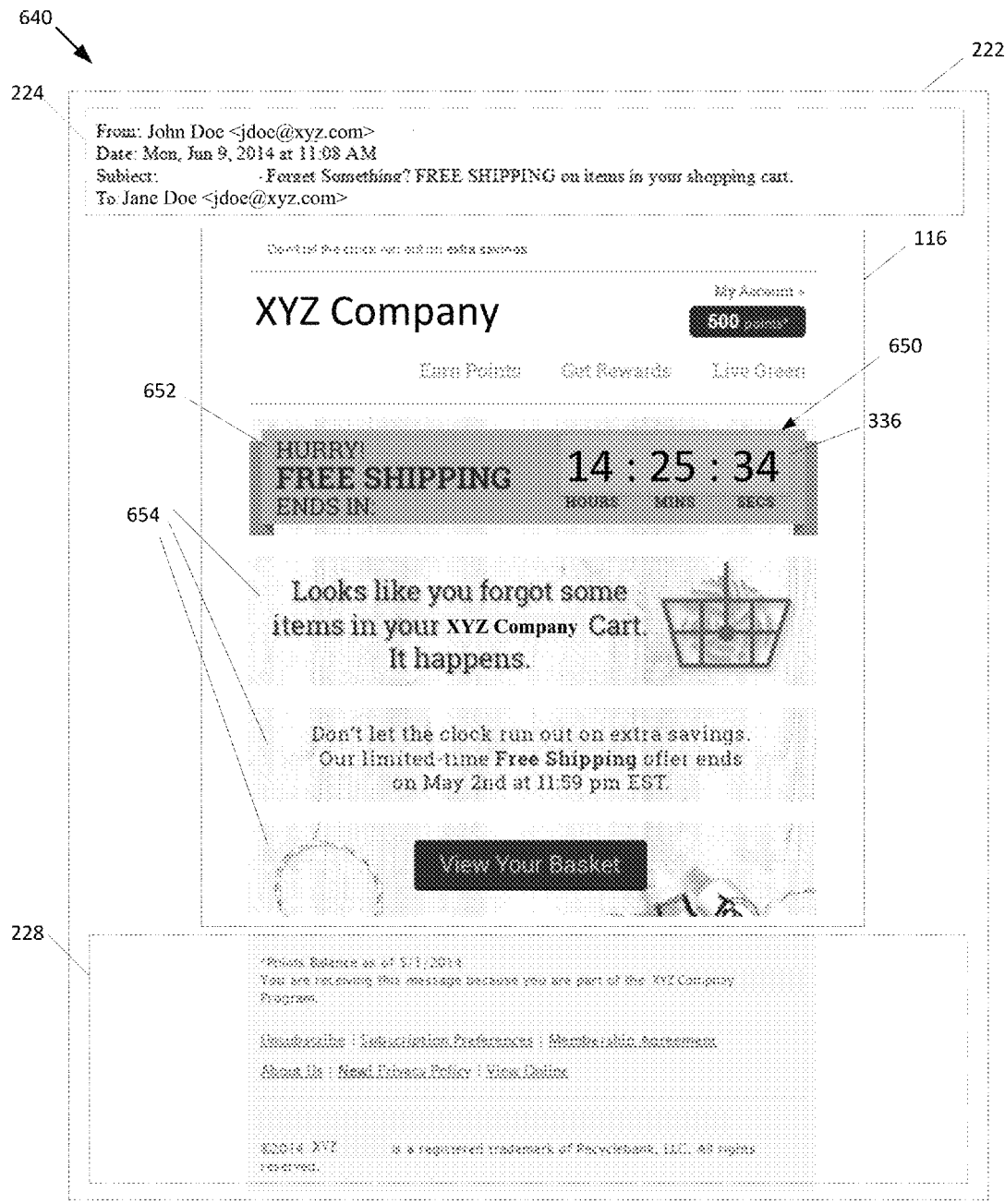
FIG. 20 is an example message content contained in an electronic message.

FIG. 20 is an example message content 640 contained in the electronic message 114. In the depicted example, the electronic message 114 is an email message that includes the message content template 222 and the adaptive content 116.

As described above, the message content template 222 includes the header 224 and the footer 228.

The header 224 includes one or more fields about different information of the electronic message 114. In the depicted example, the fields include "From," "Date," "Subject," and "To." Other fields are available in other embodiments.

The footer 228 contains information that does not change from one electronic message to another. In the depicted example, the footer 228 includes several website links, trademark information, and other general information about the author A.

The adaptive content 116 includes the customization content 650, the background content 652, and the standard content 654.

The customization content 650 is a content that varies depending on the customization criteria 250 associated with the recipient R, the recipient computing device 106, etc. The customization content 650 consists of one or more adaptive content elements 336 that are selected based upon the customization condition or criterion in view of the rule file 264 (or the content rule 142). Therefore, the customization content 650 is configured to change depending on a variety of factors, such as the identity of the recipient R (e.g., who views the electronic message 114), the local time of the recipient R (e.g., when the electronic message 114 is viewed), the location of the recipient R (e.g., where the electronic message 114 is viewed), the user agent of the recipient R (e.g., the email browser or program that the recipient R is using), etc. In the depicted example, the customization content 650 is generated for a countdown timer. The countdown timer can consists of a plurality of content elements 336. In particular, the animation or dynamic variation of the countdown is made by displaying a plurality of still images (i.e., content elements) in sequence for a predetermined period of time. Such still images (i.e., the content elements) for the countdown timer can be individually identified according to the customization criteria 320 in the rule file 264. Thus, the customization content 650 can display different countdown times when different recipients R open the electronic message 114 at different locations and/or dates/times.

The background content 652 is a content that provides a background frame or image for the standard content 654 and/or the customization content 650 in the adaptive content 116. In the depicted example, the background content 652 provides a background frame behind the customization content 650 (i.e., the countdown timer).

The standard content 654 is a content that does not typically change by different conditions of the recipient R or the recipient computing device 106. In the depicted example, the standard content 654 includes advertising statements or web banners.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of providing adaptive content in an electronic message, the method comprising:
   receiving an adaptive content asset at a server computing device from at least one of: an author computing device and a third party data provider computing device, the adaptive content asset including adaptive content elements configured to be used in the electronic message;
   receiving a content rule at the server computing device from at least one of: the author computing device and the third party data provider computing device, the content rule including customization criteria, wherein the customization criteria includes a plurality of customization conditions associated with a recipient computing device;
   selecting a set of the adaptive content elements from the adaptive content asset, the set of the adaptive content elements being selected to satisfy the plurality of customization conditions in the customization criteria;
   associating, at the server computing device, the set of the adaptive content elements with a content locator;
   sending the content locator to the author computing device to permit the author computing device to include the content locator in the electronic message and send the electronic message to the recipient computing device; and
   receiving, at the server computing device, a request when the recipient opens the electronic message, the request including the content locator, the content locator usable to identify one or more adaptive content elements from the set of the adaptive content elements to be presented to the recipient in the electronic message.

2. The method of claim 1, further comprising:
   generating an adaptive content file configured to store the set of the adaptive content elements.

3. The method of claim 1, wherein the adaptive content asset includes a standard content asset and a customization content asset, the customization content asset including the adaptive content elements.

4. The method of claim 1, wherein the content locator is a uniform resource locator.

5. The method of claim 1, further comprising:
   receiving a request from the recipient computing device, the request including the content locator and at least one customization factor associated with the recipient computing device;
   determining a first customization condition from the at least one customization factor based upon the content rule;
   identifying a first adaptive content element from the set of the adaptive content elements, the first adaptive content element satisfying the first customization condition based upon the content rule; and
   providing the first adaptive content element to the recipient computing device.

6. The method of claim 5, wherein the at least one customization factor includes a location, a local time, and a user agent of the recipient computing device.

7. The method of claim 1, further comprising:
receiving a request from the recipient computing device, the request including the content locator and at least one customization factor associated with the recipient computing device;
determining a first customization condition from the at least one customization factor based upon the adaptive content rule;
locating a first adaptive content element among the set of the adaptive content elements, the first adaptive content element satisfying the first customization condition based upon the content rule;
generating an updated content locator to the recipient computing device, the updated content locator configured to locate the first adaptive content element; and
sending a redirect response with the updated content locator to the recipient computing device.

8. The method of claim 1, further comprising:
receiving a second request from the recipient computing device, the second request including the updated content locator; and
providing the first adaptive content element to the recipient computing device.

9. The method of claim 7, wherein the at least one customization factor includes a location, a local time, and a user agent of the recipient computing device.

10. The method of claim 7, wherein the redirect response is in a HTTP 302 response.

11. An adaptive content management system for providing adaptive content in an electronic message, the system comprising:
a processing device configured to control an adaptive content management engine;
an adaptive content database; and
a computer readable storage device storing software instructions that, when executed by the processing device, cause the adaptive content management engine to:
receive an adaptive content asset from at least one of: an author computing device and a third party data provider computing device, the adaptive content asset including adaptive content elements configured to be used in the electronic message, wherein the adaptive content asset is stored in the adaptive content database;
receive a content rule from at least one of: the author computing device and the third party data provider computing device, the content rule including customization criteria, wherein the customization criteria includes a plurality of customization conditions associated with a recipient computing device;
select a set of the adaptive content elements from the adaptive content asset, the set of the adaptive content elements being selected to satisfy the plurality of customization conditions in the customization criteria;
associate the set of the adaptive content elements with a content locator;
send the content locator to the author computing device to permit the author computing device to include the content locator in the electronic message and sends the electronic message to the recipient computing device; and
receive a request when the recipient opens the electronic message, the request including the content locator, the content locator usable to identify one or more adaptive content elements from the set of the adaptive content elements to be presented to the recipient in the electronic message.

12. The system of claim 11, wherein the software instructions further cause the adaptive content management engine to:
generate an adaptive content file configured to store the set of the adaptive content elements, wherein the adaptive content file is stored in the adaptive content database.

13. The system of claim 11, wherein the adaptive content asset includes a standard content asset and a customization content asset, the customization content asset including the adaptive content elements.

14. The system of claim 11, wherein the content locator is a uniform resource locator.

15. The system of claim 11, wherein the software instructions further cause the adaptive content management engine to:
receive a request from the recipient computing device, the request including the content locator and at least one customization factor associated with the recipient computing device;
determine a first customization condition from the at least one customization factor based upon the content rule;
identify a first adaptive content element from the set of the adaptive content elements, the first adaptive content element satisfying the first customization condition based upon the content rule; and
provide the first adaptive content element to the recipient computing device.

16. The system of claim 11, wherein the at least one customization factor includes a location, a local time, and a user agent of the recipient computing device.

17. The system of claim 11, wherein the software instructions further cause the adaptive content management engine to:
receive a request from the recipient computing device, the request including the content locator and at least one customization factor associated with the recipient computing device;
determine a first customization condition from the at least one customization factor based upon the adaptive content rule;
locate a first adaptive content element among the set of the adaptive content elements, the first adaptive content element satisfying the first customization condition based upon the content rule;
generate an updated content locator to the recipient computing device, the updated content locator configured to locate the first adaptive content element;
send a redirect response with the updated content locator to the recipient computing device;
receive a second request from the recipient computing device, the second request including the updated content locator; and
provide the first adaptive content element to the recipient computing device.

18. The system of claim 17, wherein the redirect response is in a HTTP 302 response.

19. The system of claim 11, wherein the software instructions further cause the adaptive content management engine to:

send a request for additional data to a third party data provider computing device, the request including the at least one customization factor associated with the recipient computing device; and receive the additional data from the third party data provider computing device.

20. An adaptive content management system for providing adaptive content in an electronic message, the system comprising:

a processing device configured to control an adaptive content management engine;

an adaptive content database; and a computer readable storage device storing software instructions that, when executed by the processing device, cause the adaptive content management engine to:

receive an adaptive content asset from at least one of: an author computing device and a third party data provider computing device, the adaptive content asset including adaptive content elements configured to be used in the electronic message, wherein the adaptive content asset is stored in the adaptive content database;

receive a content rule from at least one of: the author computing device and the third party data provider computing device, the content rule including customization criteria, wherein the customization criteria includes a plurality of customization conditions associated with a recipient computing device;

select a set of the adaptive content elements from the adaptive content asset, the set of the adaptive content elements being selected to satisfy the plurality of customization conditions in the customization criteria;

associate the set of the adaptive content elements with a content locator;

generate an adaptive content file configured to store the set of the adaptive content elements, wherein the adaptive content file is stored in the adaptive content database;

send the content locator to the author computing device to permit the author computing device to include the content locator in the electronic message and sends the electronic message to the recipient computing device;

receive a request after the recipient opens the electronic message, the request including the content locator and at least one customization factor associated with the recipient computing device, the content locator usable to identify one or more adaptive content elements from the set of the adaptive content elements to be presented to the recipient in the electronic message;

determine a first customization condition from the at least one customization factor based upon the adaptive content rule;

locate a first adaptive content element among the set of the adaptive content elements, the first adaptive content element satisfying the first customization condition based upon the content rule;

generate an updated content locator to the recipient computing device, the updated content locator configured to locate the first adaptive content element;

send a redirect response with the updated content locator to the recipient computing device;

receive a second request from the recipient computing device, the second request including the updated content locator; and provide the first adaptive content element to the recipient computing device.

* * * * *